(12) United States Patent
Noh et al.

(10) Patent No.: US 11,284,176 B2
(45) Date of Patent: Mar. 22, 2022

(54) PANEL BOTTOM MEMBER STRUCTURE AND DISPLAY DEVICE

(71) Applicant: Samsung Display Co., Ltd., Yongin-Si (KR)

(72) Inventors: Jung Hun Noh, Yongin-si (KR); Yi Joon Ahn, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/907,670

(22) Filed: Jun. 22, 2020

(65) Prior Publication Data
US 2020/0322707 A1 Oct. 8, 2020

Related U.S. Application Data

(63) Continuation of application No. 16/130,033, filed on Sep. 13, 2018, now Pat. No. 10,694,274.

(30) Foreign Application Priority Data

Oct. 12, 2017 (KR) .......................... 10-2017-0132785

(51) Int. Cl.
| | | |
|---|---|---|
| *H04R 1/02* | (2006.01) | |
| *G06F 1/16* | (2006.01) | |
| *G02F 1/1333* | (2006.01) | |
| *G02F 1/1343* | (2006.01) | |

(Continued)

(52) U.S. Cl.
CPC ......... *H04R 1/028* (2013.01); *G02F 1/13338* (2013.01); *G02F 1/13439* (2013.01);
(Continued)

(58) Field of Classification Search
CPC .......... H04R 7/04; H04R 9/06; H04R 17/005; H04R 2499/15; G02F 1/13338;
(Continued)

(56) References Cited

U.S. PATENT DOCUMENTS

| | | |
|---|---|---|
| 8,934,228 B2 | 1/2015 | Franklin et al. |
| 9,317,063 B2 | 4/2016 | Kwon et al. |

(Continued)

FOREIGN PATENT DOCUMENTS

| | | |
|---|---|---|
| EP | 1952664 | 3/2010 |
| EP | 3229272 | 10/2017 |

(Continued)

OTHER PUBLICATIONS

Extended European Search Report—EP18199973.1 dated Mar. 11, 2019, citing references listed within.

(Continued)

*Primary Examiner* — Sunita Joshi
(74) *Attorney, Agent, or Firm* — Cantor Colburn LLP

(57) ABSTRACT

A panel bottom member structure includes a panel bottom member including a light absorbing member, a top bonding layer disposed on the light absorbing member, an acoustic vibration element disposed beneath the light absorbing member and generating a vibration in response to an acoustic signal, and a buffer member disposed beneath the light absorbing member and non-overlapping the acoustic vibration element, and an element circuit board connected to the acoustic vibration element and provided with an acoustic element driving chip for generating the acoustic signal.

17 Claims, 22 Drawing Sheets

(51) Int. Cl.
  *H04R 7/04* (2006.01)
  *H04R 9/06* (2006.01)
  *H04R 17/00* (2006.01)
(52) U.S. Cl.
  CPC ...... *G02F 1/133345* (2013.01); *G06F 1/1605* (2013.01); *G06F 1/1626* (2013.01); *G06F 1/1637* (2013.01); *G06F 1/1643* (2013.01); *G06F 1/1652* (2013.01); *G06F 1/1688* (2013.01); *H04R 7/04* (2013.01); *H04R 9/06* (2013.01); *H04R 17/005* (2013.01); *H04R 2499/15* (2013.01)
(58) Field of Classification Search
  CPC .......... G06F 1/605; G06F 1/643; G06F 1/652; H01L 27/323
  See application file for complete search history.

(56) References Cited

U.S. PATENT DOCUMENTS

| | | |
|---|---|---|
| 9,684,404 B2 | 6/2017 | Lee et al. |
| 10,403,691 B2 | 9/2019 | Kim |
| 2010/0156818 A1* | 6/2010 | Burrough ................ G06F 3/041 345/173 |
| 2016/0147345 A1 | 5/2016 | Lee et al. |
| 2016/0179259 A1 | 6/2016 | Watanabe et al. |
| 2016/0218153 A1* | 7/2016 | Kim ...................... H01L 27/323 |
| 2017/0280234 A1* | 9/2017 | Choi ...................... H04R 7/045 |
| 2018/0239181 A1 | 8/2018 | Kimura |

FOREIGN PATENT DOCUMENTS

| | | |
|---|---|---|
| EP | 2821844 | 4/2018 |
| KR | 1020160062792 A | 6/2016 |
| KR | 1020160093177 A | 8/2016 |

OTHER PUBLICATIONS

Korean Notice of Allowance for Application No. 10-2017-0132785 dated Nov. 29, 2021 enumerating the above listed references in the Korean Notice of Allowance.

* cited by examiner

PANEL BOTTOM MEMBER STRUCTURE AND DISPLAY DEVICE

This application is a continuation of U.S. patent application Ser. No. 16/130,033, filed on Sep. 13, 2018, which claims priority to Korean Patent Application No. 10-2017-0132785, filed on Oct. 12, 2017, and all the benefits accruing therefrom under 35 U.S.C. § 119, the content of which in its entirety is herein incorporated by reference.

BACKGROUND

1. Field

Exemplary embodiments of the invention relate to a panel bottom member structure and a display device.

2. Description of the Related Art

An electronic appliance such as a smart phone, a digital camera, a notebook computer, a navigator, or a smart television ("TV"), which provides an image to a user, includes a display device for displaying an image. The display device includes a display panel for generating and displaying an image and a panel bottom member disposed under the display panel. The panel bottom member may include various functional sheets for protecting the display panel from heat, external impact, or the like.

SUMMARY

A typical display device is problematic in that it has only a function of displaying an image, and thus an electronic appliance is desired to be provided with an additional speaker.

An exemplary embodiment of the invention is to provide a panel bottom member structure in which an acoustic vibration element is coupled with an acoustic element driving unit.

Another exemplary embodiment of the invention is to provide a display device in which an acoustic vibration element is coupled with an acoustic element driving unit.

However, exemplary embodiments of the invention are not restricted to the one set forth herein. The above and other exemplary embodiments of the invention will become more apparent to one of ordinary skill in the art to which the invention pertains by referencing the detailed description of the invention given below.

An exemplary embodiment may be related a panel bottom member structure. The panel bottom member structure includes a panel bottom member including a light absorbing member, a top bonding layer disposed on the light absorbing member, an acoustic vibration element disposed beneath the light absorbing member and generating a vibration in response to an acoustic signal, and a buffer member disposed beneath the light absorbing member and non-overlapping the acoustic vibration element, and an element circuit board connected to the acoustic vibration element and provided with an acoustic element driving chip for generating the acoustic signal.

An exemplary embodiment may be related a display device. The display device includes a display panel, a panel bottom member including a light absorbing member disposed under the display panel, a top bonding layer disposed between the light absorbing member and the display panel and attached to an upper surface of the light absorbing member and a lower surface of the display panel, an acoustic vibration element disposed beneath the light absorbing member and generating a vibration in response to an acoustic signal, and a buffer member disposed beneath the light absorbing member and non-overlapping the acoustic vibration element, and an element circuit board connected to the acoustic vibration element and provided with an acoustic element driving chip which generates the acoustic signal.

An exemplary embodiment may be related a display device. The display device includes a display panel, a panel bottom member including a light absorbing member disposed under the display panel, a top bonding layer disposed between the light absorbing member and the display panel and attached to an upper surface of the light absorbing member and a lower surface of the display panel, an acoustic vibration element disposed beneath the light absorbing member and generating a vibration in response to an acoustic signal, and a buffer member disposed beneath the light absorbing member and non-overlapping the acoustic vibration element, an element circuit board connected to the acoustic vibration element, and a panel circuit board connected to the display panel and the element circuit board and provided with a panel driving chip which drives the display panel and an acoustic element driving chip which generates the acoustic signal.

An exemplary embodiment may be related a display device. The display device includes a display panel, a touch sensing member disposed on the display panel, a panel bottom member including a light absorbing member disposed under the display panel, a top bonding layer disposed between the light absorbing member and the display panel and attached to an upper surface of the light absorbing member and a lower surface of the display panel, an acoustic vibration element disposed beneath the light absorbing member and generating a vibration in response to an acoustic signal, and a buffer member disposed beneath the light absorbing member and non-overlapping the acoustic vibration element, an element circuit board connected to the acoustic vibration element, and a touch circuit board connected to the touch sensing member and provided with a touch driving chip which senses a touch and an acoustic element driving chip which generates the acoustic signal, wherein the element circuit board is electrically connected with the touch circuit board.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
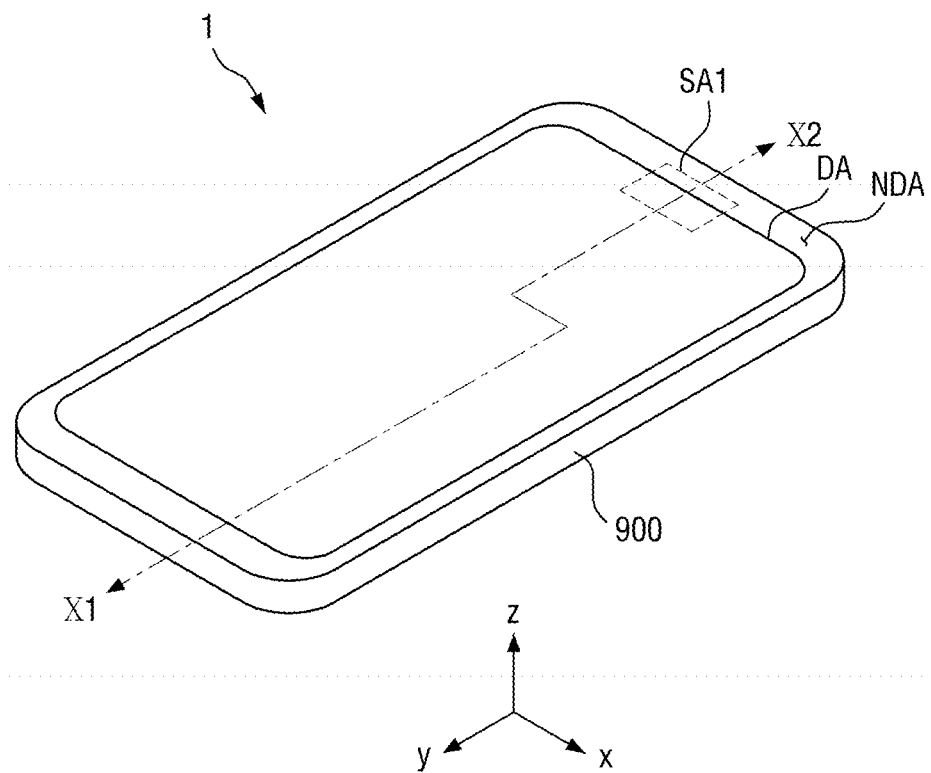
FIG. 1 is a perspective view of an exemplary embodiment of a display device according to the invention.

Features of the invention and methods of accomplishing the same may be understood more readily by reference to the following detailed description of embodiments and the accompanying drawings. The invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. For example, if the device in the drawing figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments herein will be described with reference to plan views and cross-sectional views, which are ideal schematic views of the invention. Thus, the forms of illustrations may be modified by manufacturing techniques and/or tolerances. Accordingly, embodiments of the invention are not limited to the shown specific form, but include changes in the forms that are created according to the manufacturing process. Therefore, the areas illustrated in the drawings have schematic attributes. The shapes of the areas illustrated in the drawings are intended to illustrate the specific forms of the areas of elements, and are not intended to limit the scope of the invention.

Throughout the specification, the same reference numerals are used for the same or similar components.

Hereinafter, embodiments of the invention will be described with reference to the attached drawings.

Figure 2:
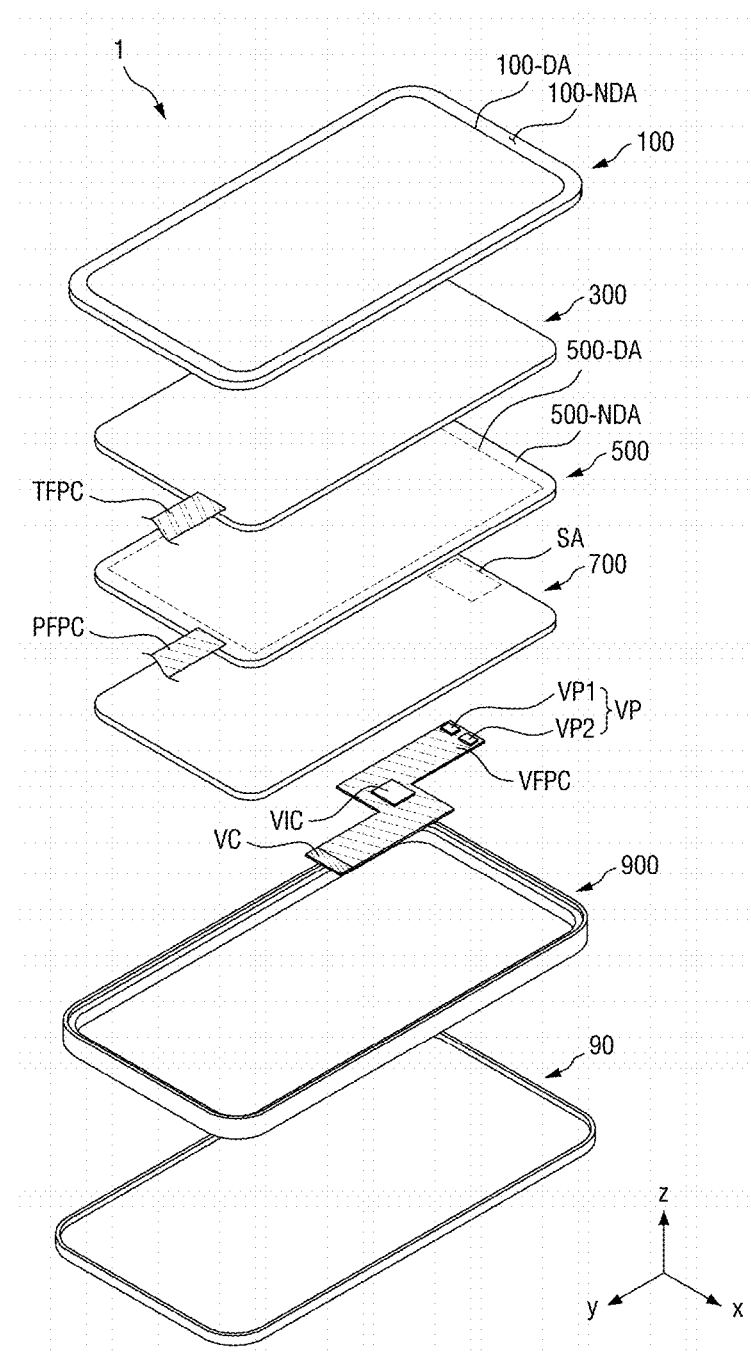
FIG. 2 is an exploded perspective view of the display device shown in FIG. 1.
Figure 3:
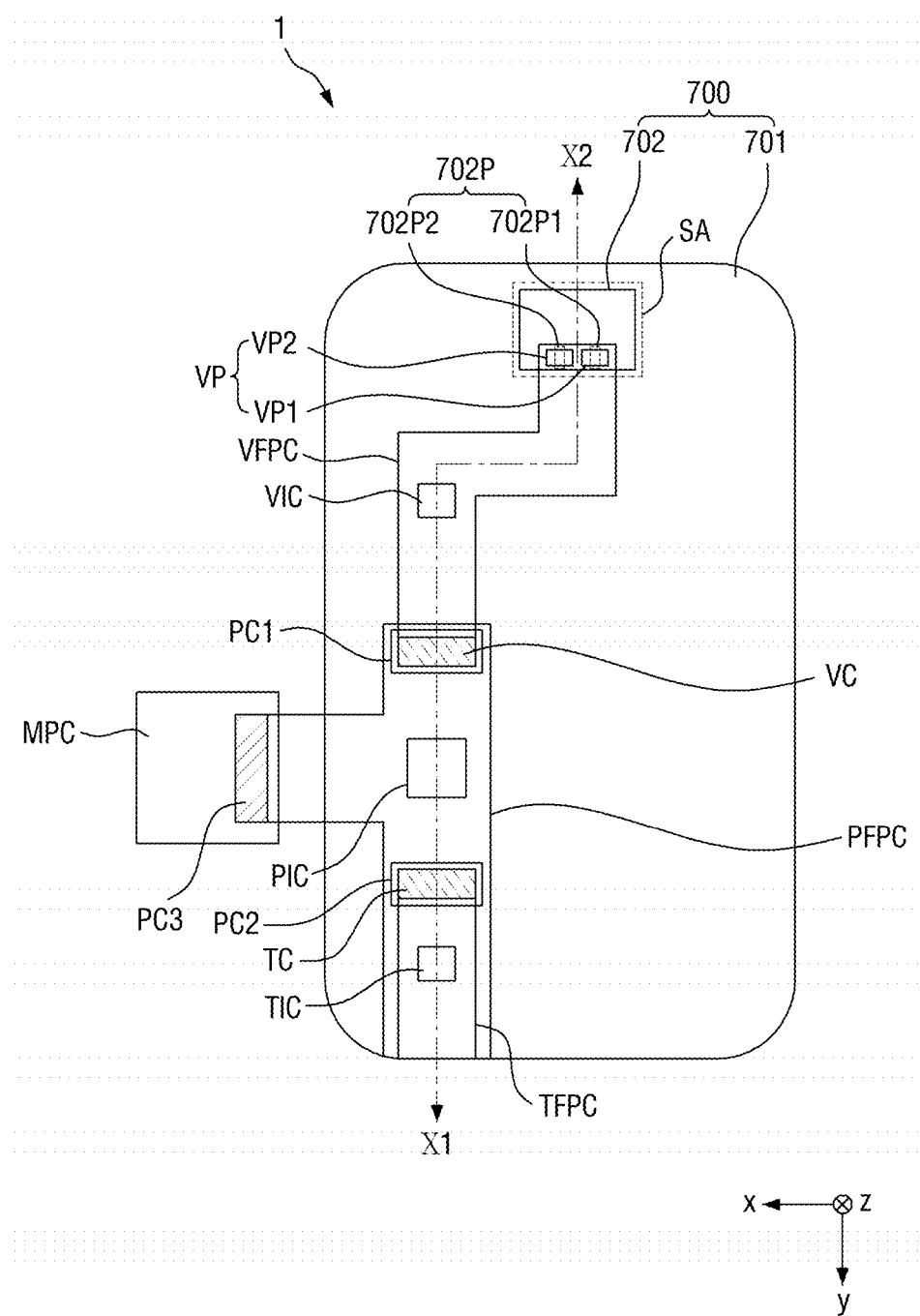
FIG. 3 is a view showing the connection structure among an acoustic vibration element, a flexible circuit board, a panel flexible circuit board, a touch flexible circuit board and a main circuit board in the display device shown in FIG. 1.
Figure 4:
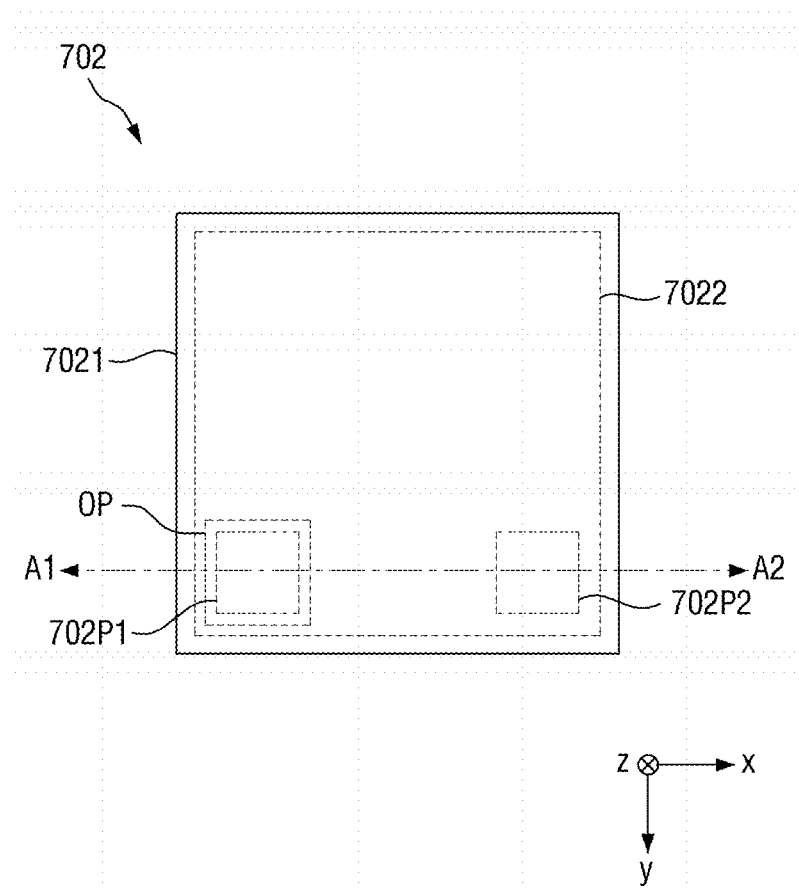
FIG. 4 is a plan view showing the structure of an acoustic vibration element.
Figure 5:
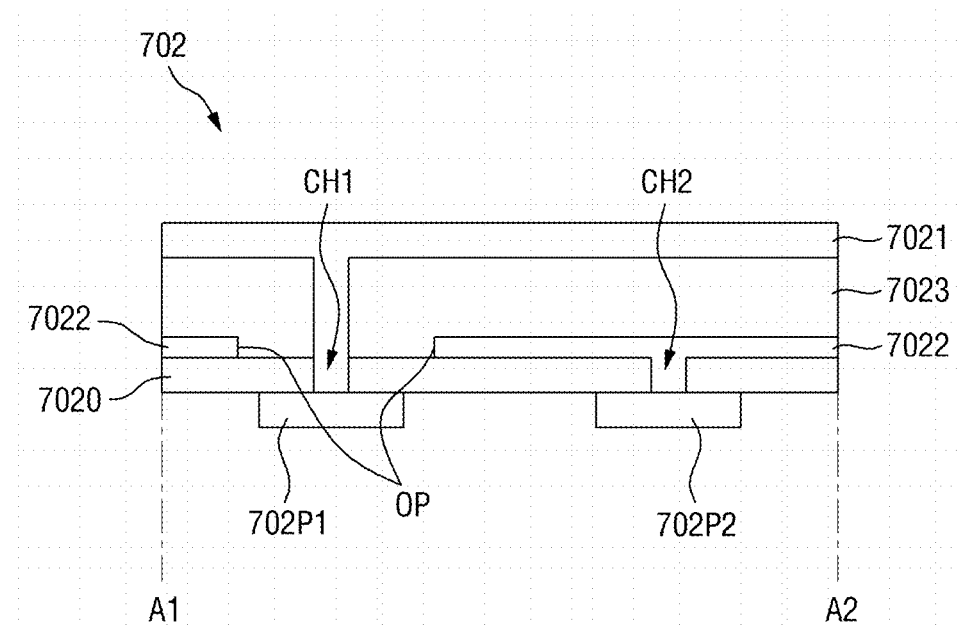
FIG. 5 is a cross-sectional view taken along line A1-A2 in FIG. 4.
Figure 6:
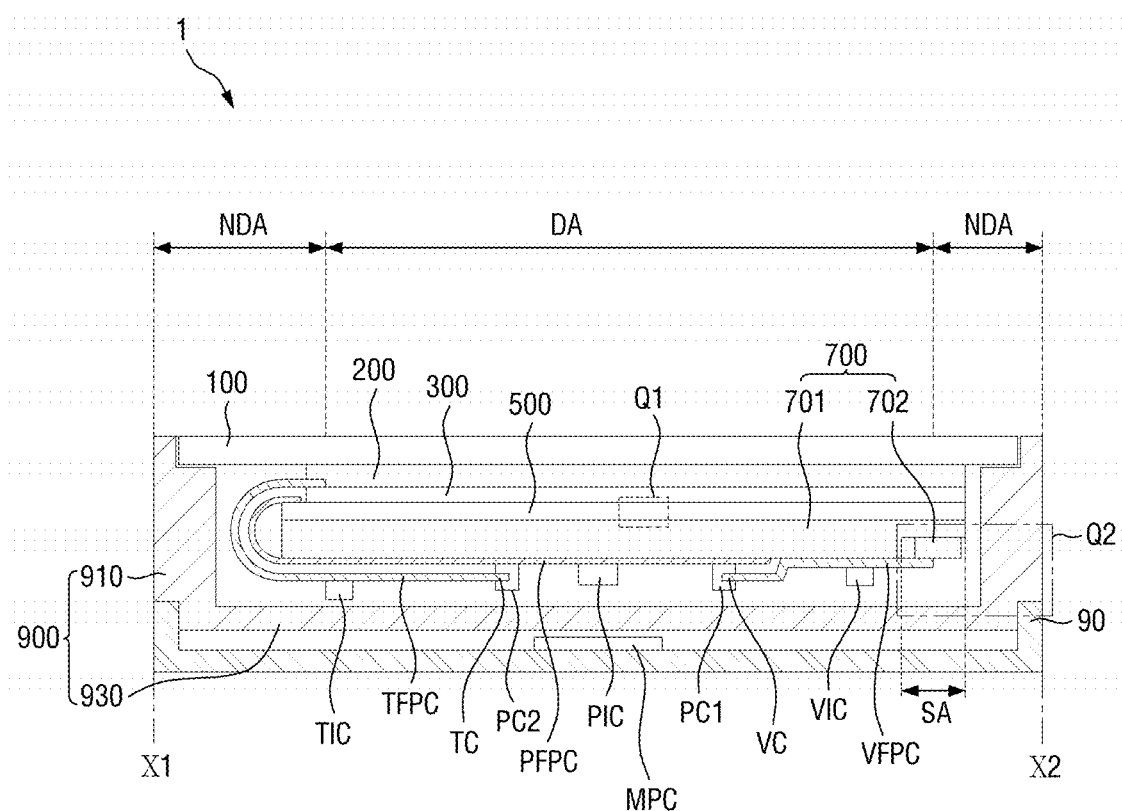
FIG. 6 is a cross-sectional view taken along line X1-X2 in FIGS. 1 and 3.

FIG. 1 is a perspective view of a display device according to an exemplary embodiment of the invention, FIG. 2 is an exploded perspective view of the display device shown in FIG. 1, FIG. 3 is a view showing the connection structure among an acoustic vibration element, a flexible circuit board, a panel flexible circuit board, a touch flexible circuit board and a main circuit board in the display device shown in FIG. 1, FIG. 4 is a plan view showing the structure of an acoustic vibration element, FIG. 5 is a cross-sectional view taken along line A1-A2 in FIG. 4, and FIG. 6 is a cross-sectional view taken along line X1-X2 in FIGS. 1 and 3.

FIG. 1 shows a portable terminal as an example to which a display device 1 according to an exemplary embodiment of the invention is applied. Examples of the portable terminal may include a tablet personal computer ("PC"), a smart phone, a personal digital assistant ("PDA"), a portable multimedia player ("PMP"), a game machine, and a wrist watch-type electronic appliance. However, the invention is not limited to the specific kind of the display device 1. In another exemplary embodiment of the invention, the display device 1 may be used for small and medium-sized electronic appliances such as a personal computer, a notebook computer, a car navigator, and a camera, in addition to large sized electronic appliances such as a television and an external billboard.

Referring to FIG. 1, the display device 1 may have a rectangular shape in a plan view. The display device 1 may include both short sides extending in one direction x and both long sides extending in the other direction y. The corner where the long side and short side of the display device 1 meet each other may be right angled, but may have a curved surface as shown in FIG. 1. The planar shape of the display device 1 is not limited to the illustrated one, and may have a circular shape or other shapes.

The display device 1 includes a display area DA for displaying an image and a non-display area NDA adjacent to the display area DA. In some exemplary embodiments, the non-display area NDA may be disposed to surround the display area DA.

The display device 1 may include an element area SA in which an acoustic vibration element to be described later is disposed. The acoustic vibration element is a concept that includes an element realizing a speaker function or microphone function using vibration.

In some exemplary embodiments, a part of the element area SA may be a part of the display area DA.

In an exemplary embodiment, as shown in FIG. 1, a part of the element area SA may be a part of the display area DA, and the rest of the element area SA may be a part of the non-display area NDA, for example.

Although it is shown in FIG. 1 that the element area SA is adjacent to one short side of the display device 1 in the non-display area NDA, the invention is not limited thereto. In addition, the disposition of the element area SA may be variously changed. In an exemplary embodiment, the element area SA may be located adjacent to each of both short sides of the display device 1, for example. Further, the element area SA may be located adjacent to at least one of both long sides of the display device 1. Hereinafter, for convenience of explanation, it is assumed that the element area SA is located adjacent to one side of the display device 1.

Referring to FIGS. 1 to 6, the display device 1 includes a display panel 500, a panel bottom member 700 disposed beneath the display panel 500, and an element circuit board VFPC disposed beneath the panel bottom member 700. The display device 1 may further include a panel circuit board PFPC connected to the display panel 500 and a main circuit board MPC connected to the panel circuit board PFPC. The display device 1 may further include a touch sensing member 300 disposed on the display panel 500 and a touch circuit board TFPC connected to the touch sensing member 300. The display device 1 may further include a window 100 disposed on the touch sensing member 300, a bracket 900 disposed under the panel bottom member 700, and a lower case 90 disposed under the bracket 900.

Unless defined otherwise, in this specification, the "over", "on", "top" and "upper surface" refer to a direction toward a display surface, that is, a z-direction, with respect to the display panel 500, and the "under", "beneath", "bottom" and "lower surface" refer to a direction opposite to a display surface, that is, a direction opposite to the z-direction, with respect to the display panel 500.

The display panel 500 includes a display area 500-DA and a non-display area 500-NDA. The display area 500-DA, which is an area where an image is displayed, overlaps a light-transmitting area 100-DA of the window 100. The non-display area 500-NDA, which is an area where an image is not displayed, is adjacent to the display area 500-DA, and overlaps a light-blocking area 100-NDA of the window 100.

In some exemplary embodiments, the display panel 500 may be a display panel including a self-luminous element. In an exemplary embodiment, the self-luminous element may include at least one of an organic light emitting diode ("OLED"), a quantum dot light emitting diode ("QLED"), and an inorganic material-based micro light emitting diode (e.g., Micro LED).

Hereinafter, for convenience of explanation, a case where the self-luminous element is an organic light emitting diode will be described as an example, and details of each configuration of the display panel 500 will be described later with reference to FIG. 7.

The window 100 includes a light-transmitting area 100-DA for transmitting an image provided by the display panel 500 and a light-blocking area 100-NDA adjacent to the light-transmitting area 100-DA. In some exemplary embodiments, the inner surface of the light-blocking area 100-NDA of the window 100 may have an opaque masking layer.

The window 100 may be disposed over the display panel 500 to protect the display panel 500. The window 100 may be disposed to overlap the display panel 500 and cover the entire surface of the display panel 500. That is, the window 100 may be larger than the display panel 500. In an exemplary embodiment, the window 100 may protrude outward from the display panel 500 at both short sides of the display device 1, for example. Although the window 100 may also protrude outward from the display panel 500 even at both long sides of the display device 1, the protrusion distance at both short sides may be greater than the protrusion distance at both long sides.

In an exemplary embodiment, the window may include glass, sapphire, plastic, or the like, for example. In an exemplary embodiment, the window 100 may be rigid, but the invention is not limited thereto. In another exemplary embodiment, the window 100 may also be flexible.

In an exemplary embodiment, the touch sensing member 300 may be disposed between the display panel 500 and the window 100.

The touch sensing member 300 may sense a position of a touch input from the outside. The touch sensing member 300 may acquire position information of a touched point by a self capacitance method and/or a mutual capacitance method.

In exemplary embodiments, the touch sensing member 300 may be a rigid panel type member, a flexible panel type member, or a film type member.

In some exemplary embodiments, the touch sensing member 300 may be unitary with the display panel 500. In an exemplary embodiment, the touch electrodes of the touch sensing member 300 may be located directly on the sealing portion of the display panel 500, for example. In another exemplary embodiment, the touch sensing member 300 may be provided separately from the display panel 500, and may be coupled with the display panel 500 through a separate bonding layer or the like.

The touch sensing member 300 and the window 100 may be coupled with each other by a transparent bonding layer 200 such as an optical clear adhesive ("OCA") layer or an optical clear resin ("OCR") layer. In another exemplary embodiment, the touch sensing member 300 may be omitted. In this case, the display panel 500 and the window 100 may be coupled with each other by an OCA layer, an OCR layer, or the like.

The panel bottom member 700 may be disposed beneath the display panel 500, and may be coupled with the display panel 500. The panel bottom member 700 may have substantially the same size as that of the display panel 500 and may be disposed to overlap the display panel 500, and the side surface of the panel bottom member 700 may be aligned with the side surface of the display panel 500. However, the invention is not limited thereto. The panel bottom member 700 may perform a heat radiation function, an electromagnetic wave blocking function, a light blocking function a light absorbing function, a buffering function, a digitizing function, and the like. In exemplary embodiments, the panel bottom member 700 may include a functional layer having at least one of the above-described functions. The functional layer may be provided in various forms such as a layer, a film, a sheet, a plate, and a panel.

The panel bottom member 700 may include a functional layer unit 701 and an acoustic vibration element 702 coupled with the lower side of the functional layer unit 701.

The functional layer unit 701 is a unit including one or a plurality of above-described functional layers. When the functional layer unit 701 includes a plurality of functional layers, the respective functional layers may be overlapped and laminated. One functional layer may be laminated directly on the top of another functional layer or may be coupled with another functional layer through a bonding layer.

The thickness of a portion of the functional layer unit 701, the portion being located in the element area SA, may be thinner than the thickness of the other portions.

The acoustic vibration element 702 is an element that vibrates in response to an acoustic signal which is an electrical signal corresponding to acoustic data. The acoustic vibration element 702 may be realized as a piezoelectric element including a vibration material layer. In this case, the vibrating material layer is mechanically deformed in response to the acoustic signal, and the acoustic vibration element 702 may vibrate by the mechanical deformation. In an exemplary embodiment, the vibration material layer may include at least one of a piezoelectric body, a piezoelectric film (polyvinylidene fluoride ("PVDF") film), and an electroactive polymer. In another exemplary embodiment, the acoustic vibration element 702 may include, for example, a magnet and a coil surrounding the magnet and flowing a current corresponding to the acoustic signal. The acoustic vibration element 702 may vibrate by an electromagnetic force corresponding to a current flowing in the coil. Hereinafter, a case where the acoustic vibration element 702 includes the vibration material layer will be described as an example.

The acoustic vibration element 702 may be coupled with the lower side of the functional layer unit 701, and may be located in the element area SA.

The acoustic vibration element 702 may include both electrodes, a vibration material layer disposed therebetween, and pads respectively connected to the both electrodes.

As shown in FIGS. 4 and 5, the acoustic vibration element 702 includes a base layer 7020, a first electrode 7021, a second electrode 7022, a vibration material layer 7023, a first pad 702P1, and a second pad 702P2. The first pad 702P1 and the second pad 702P2 constitute a pad unit 702P.

The base layer 7020 may include an insulating material.

The second electrode 7022 may be disposed on the base layer 7020, and the vibration material layer 7023 may be disposed on the second electrode 7022. The first electrode 7021 may be disposed on the vibration material layer 7023.

The vibration material layer 7023 may include a piezoelectric material that vibrates by an electric field provided by the first electrode 7021 and the second electrode 7022. In an exemplary embodiment, the piezoelectric material, for example, may be at least one of PVDF, lead zirconate titanate ceramic, and an electroactive polymer.

The first electrode 7021 and the second electrode 7022 provide an electric field to the vibration material layer 7023. The first electrode 7021 and the second electrode 7022 may include a conductive material. Examples of the conductive material may include a transparent conductor such as indium tin oxide ("ITO") or indium zinc oxide ("IZO"), an opaque metal, a conductive polymer, and a carbon nanotube ("CNT").

The first pad 702P1 and the second pad 702P2 may be disposed beneath the base layer 7020. The first pad 702P1 and the second pad 702P2 are connected to the flexible element circuit board VFPC, and may include a conductive material. Examples of the materials of the first pad 702P1 and the second pad 702P2 may be the same as those of the first electrode 7021 and the second electrode 7022.

An opening OP may be partially defined in the second electrode 7022. The first electrode 7021 may be connected to the first pad 702P1 through a first hole CH1 penetrating the vibration material layer 7023 and the base material layer 7020. The second electrode 7022 may be connected to a second pad 702P2 through a second hole CH2 penetrating the base layer 7020.

The first pad 702P1 and the second pad 702P2 may be respectively connected to a first connection pad VP1 and a second connection pad VP2 of the element circuit board VFPC.

In the drawings other than FIGS. 4 and 5, the base layer 7020 of the acoustic vibration element 702 is omitted for the convenience of explanation.

Besides, various embodiments of the panel bottom member 700, particularly, various embodiments of the functional layer unit 701 will be described later.

The bracket 900 may be disposed under the panel bottom member 700. The bracket 900 supports the window 100, the touch sensing member 300, the display panel 500, and the panel bottom member 700. The bracket 900 may include a bottom surface 930 and a side wall 910. The bottom surface 930 of the bracket 900 may face the lower surface of the panel bottom member 700, and the side wall 910 of the bracket 900 may face the side surfaces of the window 100, the touch sensing member 300, the display panel 500, and the panel bottom member 700. In an exemplary embodiment, the bracket 900 may include a synthetic resin material, a metal material, or a combination of different materials.

In some exemplary embodiments, a part of the bracket 900 may be exposed to the side surface of the display device 1 to form a lateral appearance of the display device 1.

The bracket 900 may not be in contact with the acoustic vibration element 702 in order to secure a space 901a (refer to FIG. 19) in which the acoustic vibration element 702 may vibrate. The space between the acoustic vibration element 702 and the bracket 900 may serve as a resonance box for amplifying vibration or sound waves provided by the acoustic vibration element 702.

The lower case 90 may be disposed under the bracket 900. The lower case 90 may accommodate structures disposed over the upper side thereof, and may form a rear surface appearance of the display device 1. In some exemplary embodiments, a space for accommodating electronic components such as a main circuit board MPC may be provided between the lower case 90 and the bracket 900. In an exemplary embodiment, the lower case 90 may include plastic or metal, for example.

Although not shown in the drawings, a waterproof adhesive member, e.g., water proof tape, may be disposed on the bottom surface of the bracket 900. The waterproof tape disposed adjacent to the long side of the bottom surface may be attached to the lower surface of the panel bottom member 700, and the waterproof tape disposed adjacent to the short side of the bottom surface may be attached to the lower surface of the window 100.

The panel circuit board PFPC is connected to the display panel 500. In some exemplary embodiments, the panel circuit board PFPC may be electrically connected to the touch circuit board TFPC and the element circuit board VFPC as well as the display panel 500.

The panel circuit board PFPC may be electrically connected to connection pads (not shown) provided on one side (e.g., short side) of the display panel 500. In an exemplary embodiment, the panel circuit board PFPC may be attached to the connection pads through an anisotropic conductive film ("ACF") or the like, for example. In an exemplary embodiment, the panel circuit board PFPC may be a film-type flexible printed circuit board ("FPCB"), for example.

The panel circuit board PFPC may be further provided with a first connection unit PC1, a second connection unit PC2, and a third connection unit PC3 in addition to the above connection pads connected to the display panel 500. The panel circuit board PFPC may be electrically connected to the element circuit board VFPC through the first connection unit PC1, may be electrically connected to the touch circuit board TFPC through the second connection unit PC2, and may be electrically connected to the main circuit board MPC through the third connection unit PC3. It is shown in the drawings that the first connection unit PC1 and the second connection unit PC2 are provided in the form of a connector, but this is only one example. In another exemplary embodiment, the first connection unit PC1 and the second connection unit PC2 may be provided in the form of a pad, and may be electrically connected to the element circuit board VFPC and the touch circuit board TFPC.

In some exemplary embodiments, a panel driving chip PIC generating a driving signal for driving the display panel 500 may be mounted (e.g., disposed) on the panel circuit board PFPC. In this case, the driving signal generated by the panel driving chip PIC may be transmitted to the display panel 500 through the panel circuit board PFPC. However, the invention is not limited thereto. In another exemplary embodiment, the panel driving chip PIC may be mounted (e.g., disposed) on the display panel 500. Hereinafter, a case where the panel driving chip PIC is mounted (e.g., disposed) on the panel circuit board PFPC will be described as an example.

The main circuit board MPC may be electrically connected to the third connection unit PC3 of the panel circuit board PFPC. The main circuit board MPC may control the overall function of the display device 1. In an exemplary embodiment, the main circuit board MPC may provide image data according to the driving of the display device 1 to the panel driving chip PIC through the panel circuit board PFPC, for example. Further, the main circuit board MPC may provide acoustic data according to the driving of the display device 1 to an acoustic element driving chip VIC through the panel circuit board PFPC and the element circuit board VFPC.

In some exemplary embodiments, the main circuit board MPC may be disposed between the bracket 900 and the lower case 90, and a portion of the panel circuit board PFPC, the portion being provided with the third connection unit PC3, may be electrically connected to the main circuit board MPC through an opening (not shown in the drawings) provided in the bracket 900.

The panel circuit board PFPC connected to the display panel 500 may be bent toward the lower side of the panel bottom member 700, and thus a part of the panel circuit board PFPC may be disposed between the panel bottom member 700 and the bracket 900.

The touch circuit board TFPC is connected to the touch sensing member 300. In some exemplary embodiments, one side of the touch circuit board TFPC may be electrically connected to the touch sensing member 300, and the other side of the touch circuit board TFPC may be electrically connected to the panel circuit board PFPC.

The touch circuit board TFPC may be electrically connected to connection pads (not shown) provided on one side (e.g., short side) of the touch sensing member 300. In an exemplary embodiment, the touch circuit board TFPC may be attached to the connection pads through an ACF or the like, for example. In an exemplary embodiment, the touch circuit board TFPC may be a film-type FPCB, for example.

The other side of the touch circuit board TFPC may be provided with a connection portion TC, and the connection portion TC may be electrically connected to the second connection unit PC2 of the panel circuit board PFPC. Although it is shown in drawings that the connection portion TC and the second connection unit PC2 are provided in the form of a connector to be coupled with each other, this is only one example. In another exemplary embodiment, when the second connection unit PC2 is provided in the form of a pad, the connection portion TC may also be provided in the form of a pad, and the connection portion TC and the second connection unit PC2 may be electrically connected to each other through an anisotropic conductive film or the like.

In some exemplary embodiments, a touch driving chip TIC may be mounted (e.g., disposed) on the touch circuit board TFPC. The touch driving chip TIC is a chip for controlling the operation of the touch sensing member 300. The touch driving chip TIC may receive a sensing signal sensed by the touch sensing member 300 and detect touch information such as a touch position. In this case, the control signal generated from the touch driving chip TIC is transmitted to the touch sensing member 300 through the touch circuit board TFPC, and the sensing signal generated from the touch sensing member 300 may be transmitted to the touch driving chip TIC through the touch circuit board TFPC.

The touch circuit board TFPC connected to the touch sensing member 300 may be bent toward the lower side of the panel bottom member 700, and thus a part of the touch circuit board TFPC may be disposed between the panel bottom member 700 and the bracket 900.

The element circuit board VFPC is connected to the acoustic vibration element 702. One side of the element circuit board VFPC may be electrically connected to the acoustic vibration element 702, and the other side of the element circuit board VFPC may be electrically connected to the panel circuit board PFPC.

One side of the element circuit board VFPC may be provided with a first connection pad VP1 electrically connected with the first pad 702P1 of the acoustic vibration element 702 and a second connection pad VP2 electrically connected with the second pad 702P2 of the acoustic vibration element 702. The first connection pad VP1 and the second connection pad VP2 may be respectively attached to the first pad 702P1 and the second pad 702P2 through an ACF or the like.

The other side of the element circuit board VFPC may be provided with a connection portion VC, and the connection portion VC may be electrically connected to the first connection unit PC1 of the panel circuit board PFPC. Although it is shown in drawings that the connection portion VC and the first connection unit PC1 are provided in the form of a connector to be coupled with each other, this is only one example. In another exemplary embodiment, when the first connection unit PC1 is provided in the form of a pad, the connection portion VC may also be provided in the form of a pad, and the connection portion VC and the first connection unit PC1 may be electrically connected to each other through an anisotropic conductive film or the like.

In an exemplary embodiment, the element circuit board VFPC may be a film-type FPCB, for example.

In this exemplary embodiment, an acoustic element driving chip VIC may be mounted (e.g., disposed) on the element circuit board VFPC. The acoustic element driving chip VIC may generate an acoustic signal in response to the data provided from an external circuit (for example, a main circuit board MPC). In this case, acoustic data provided from the main circuit board MPC may be provided to the acoustic element driving chip VIC through the panel circuit board PFPC and the element circuit board VFPC, and the acoustic element driving chip VIC may generate an acoustic signal in response to the provided acoustic data. The generated acoustic signal may be transmitted to the acoustic vibration element 702 through the element circuit board VFPC. In some exemplary embodiments, the acoustic element driving chip VIC may include an analog digital converter ("ADC") for converting the acoustic data into a digital signal, a digital signal processor ("DSP") for processing the digital signal converted by the ADC, a digital analog converter ("DAC") for converting the digital signal processed by the DSP into an analog signal, and an amplifier ("AMP") for amplifying the analog signal converted by the DAC, for example.

In this exemplary embodiment, the element circuit board VFPC may be disposed between the panel bottom member 700 and the bracket 900 without being bent.

The aforementioned display device is advantageous in that the panel bottom member 700 including the acoustic element driving chip VIC, the display panel 500, and the acoustic vibration element 702 may be modularized into one display assembly by mounting the acoustic element driving chip VIC on the element circuit board VFPC itself connected to the acoustic vibration element 702.

Figure 7:
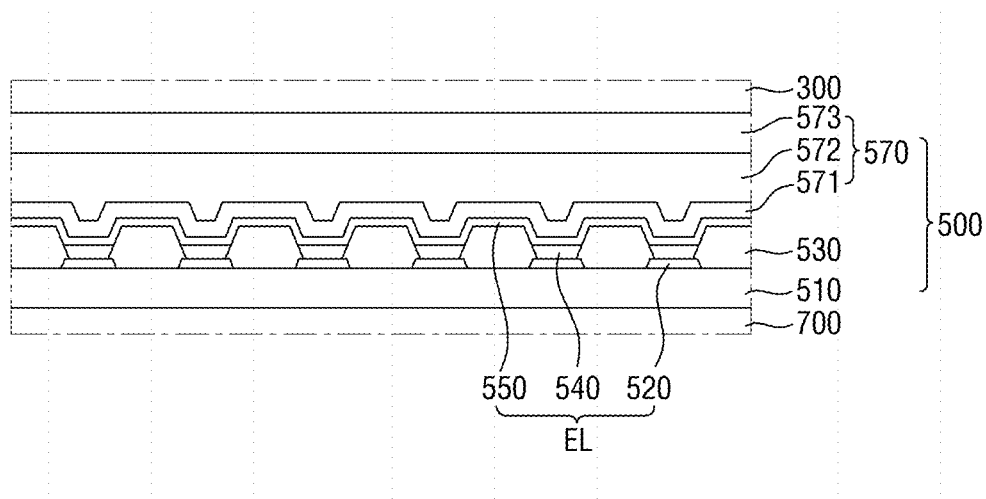
FIG. 7 is an enlarged cross-sectional view of the portion Q1 of FIG. 6, and, more specifically, is an enlarged cross-sectional view of the display panel of FIG. 6.

FIG. 7 is an enlarged cross-sectional view of the portion Q1 in FIG. 6, and, more specifically, in an enlarged cross-sectional view of the display panel in FIG. 6.

Referring to 7, the display panel 500 includes a base substrate 510, a first electrode 520, a pixel defining film 530, a light emitting layer 540, a second electrode 550, and a sealing layer 570.

The base substrate 510 may be disposed on the panel bottom member 700. The base substrate 510 may be an insulation substrate. In an exemplary embodiment, the base substrate 510 may include a flexible polymer material. Here, the polymer material may include poly ethersulphone ("PES"), polyacrylate ("PA"), polyarylate ("PAR"), polyetherimide ("PEI"), polyethylenenaphthalate ("PEN"), polyethyleneterephthalate ("PET"), polyphenylenesulfide ("PPS"), polyallylate, polyimide ("PI"), poly carbonate ("PC"), cellulosetriacetate ("CAT"), cellulose acetate propionate ("CAP"), or a combination thereof.

The first electrode 520 may be disposed on the base substrate 510. In some exemplary embodiments, the first electrode 520 may be an anode electrode.

Although not shown in the drawing, a plurality of components may be further disposed between the base substrate 510 and the first electrode 520. In an exemplary embodiment, the plurality of components may include a buffer layer, a plurality of conductive wirings, an insulation layer, and a plurality of thin film transistors.

The pixel defining layer 530 may be disposed on the first electrode 520. Openings exposing at least a part of the first electrode 520 may be defined in the pixel defining layer 530.

The light emitting layer 540 may be disposed on the first electrode 520.

In some exemplary embodiments, the light emitting layer 540 may emit one of red light, green light, and blue light, for example. In an exemplary embodiment, the wavelength of red light may be about 620 nanometers (nm) to about 750 nm, and the wavelength of green light may be about 495 nm to about 570 nm, for example. Further, the wavelength of blue light may be about 450 nm to about 495 nm, for example.

In another exemplary embodiment, the light emitting layer 540 may emit white light. When the light emitting layer 540 emits white light, the light emitting layer 540 may have a laminated structure of a red light emitting layer, a green light emitting layer, and a blue light emitting layer. The light emitting layer 540 may further include separate color filters for expressing red, green and blue colors.

In some exemplary embodiments, the light emitting layer 540 may be an organic light emitting layer. In another exemplary embodiment, the light emitting layer 540 may be a quantum dot light emitting layer or an inorganic light emitting layer.

The second electrode 550 may be disposed on the light emitting layer 540 and the pixel defining layer 530. In an exemplary embodiment, the second electrode 550 may be disposed entirely on the light emitting layer 540 and the pixel defining layer 530. In some exemplary embodiments, the second electrode 550 may be a cathode electrode.

The first electrode 520, the second electrode 550, and the light emitting layer 540 may constitute a self-luminous element EL.

The sealing layer 570 may be disposed on the self-luminous element EL. The sealing layer 570 may seal the self-luminous element EL and prevent moisture or the like from entering the self-luminous element EL from the outside.

In some exemplary embodiments, the sealing layer 570 may be provided in the form of a thin film encapsulation, and may include at least one organic film and at least one inorganic film. In an exemplary embodiment, the sealing layer 570 may include a first inorganic film 571 disposed on the second electrode 550, an organic film 572 disposed on first inorganic film 571, and a second inorganic film 573 disposed on the organic film 572, for example.

The first inorganic film 571 may be disposed on the self-luminous element EL and may prevent moisture, oxygen, or the like from penetrating the self-luminous element EL. In some exemplary embodiments, the first inorganic film 571 includes an inorganic material, and for example, the inorganic material may include at least one of silicon oxide ($SiO_x$), silicon nitride ($SiN_x$), and silicon oxynitride ($SiON_x$).

The organic film 572 may be disposed on the first inorganic film 571. The organic film 572 may improve the flatness. In an exemplary embodiment, the organic film 572 includes an organic material, and the organic material may include at least one of epoxy, acrylate, and urethane acrylate, for example.

The second inorganic film 573 may be disposed on the organic film 572. The second inorganic film 573 may play a role substantially the same as or similar to that of the first inorganic film 571, and may include a material substantially the same as or similar to that of the first inorganic film 571. The second inorganic film 573 may completely cover the organic film 572. In some exemplary embodiments, the second inorganic film 573 and the first inorganic film 571 may be in contact with each other in the non-display area NDA to form an inorganic-inorganic junction. When the inorganic-inorganic junction is provided, it is possible to effectively prevent moisture or the like from entering the display device 1 from outside.

Figure 8:
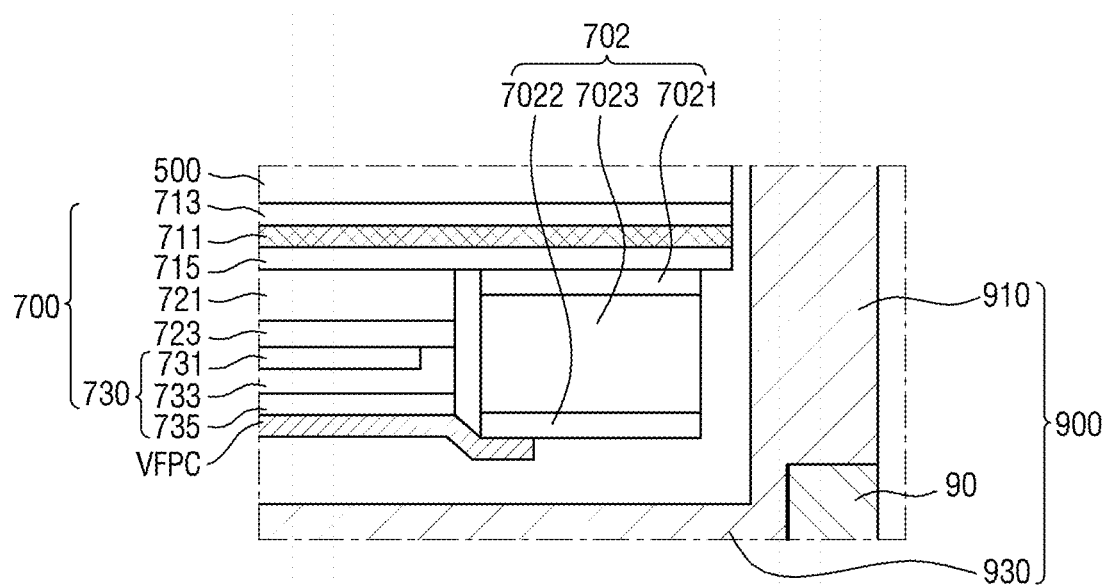
FIG. 8 is an enlarged cross-sectional view of the portion Q2 of FIG. 6, and, more specifically, is an enlarged cross-sectional view of the panel bottom member of FIG. 6.

Although it is shown in FIG. 8 that each of the first inorganic film 571, the organic film 572, and the second inorganic film 573 is a single layer, the invention is not limited thereto. That is, in other exemplary embodiments, at least one of the first inorganic film 571, the organic film 572, and the second inorganic film 573 may have a multi-layer structure.

When at least one of the first inorganic film 571 and the second inorganic film 572 has a multi-layer structure, at least one layer of the multi-layer structure may be a hexamethyldisiloxane ("HMDSO") layer, for example. The HMDSO layer may absorb stress. Thereby, the sealing layer 570 may become more flexible. In another exemplary embodiment, the organic film 572 may be changed to the HMDSO layer.

The touch sensing member 300 may be disposed on the sealing layer 570.

Figure 9:
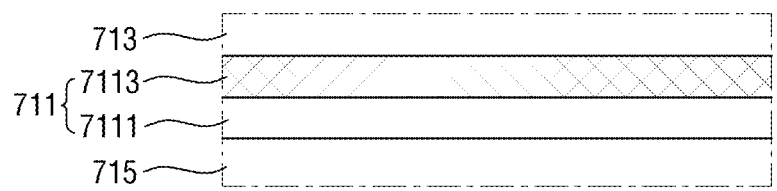
FIG. 9 is a cross-sectional view showing the structure of the light absorbing member of FIG. 8.
Figure 10:
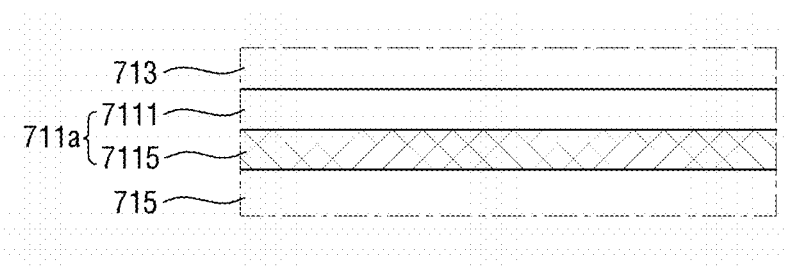
FIGS. 10 and 11 are cross-sectional views showing the modification examples of FIG. 9.
Figure 11:
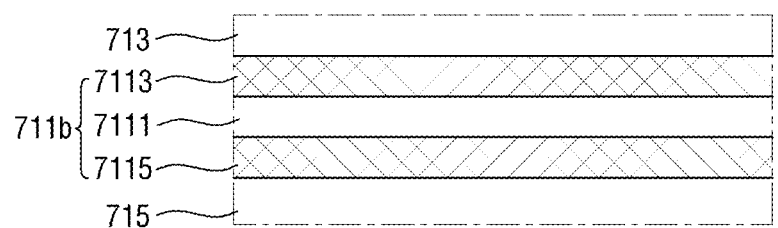

FIG. 8 is an enlarged cross-sectional view of the portion Q2 in FIG. 6, and, more specifically, in an enlarged cross-sectional view of the panel bottom member in FIG. 6. FIG. 9 is a cross-sectional view showing the structure of the light absorbing member in FIG. 8, and FIGS. 10 and 11 are cross-sectional views showing the modification examples of FIG. 9.

Referring to FIGS. 6 and 8 to 11, the functional layer unit 701 of the panel bottom member 700 includes a light absorbing member 711 disposed under the display panel 500, a top bonding layer 713 disposed between the light absorbing member 711 and the display panel 500, and a buffer member 721 disposed under the light absorbing member 711. The functional layer unit 701 of the panel bottom member 700 may further include a first interlayer bonding layer 715 disposed between the light absorbing member 711 and the buffer member 721. The functional layer unit 701 of the panel bottom member 700 may further include a second interlayer bonding layer 723 disposed beneath the buffer member 721 and a heat radiation member 730 disposed beneath the second interlayer bonding layer 723.

The light absorbing member 711 is disposed under the display panel 500. The light absorbing member 711 prevents the transmission of light to prevent the components arranged under the light absorbing member 711 from being actually recognized from above.

The light absorbing member 711 may have various structures.

In an exemplary embodiment, as shown in FIG. 9, the light absorbing member 711 may include a substrate 7111 and a first light absorbing layer 7113 disposed on the substrate 7111, for example. The top bonding layer 713 may be disposed on the first light absorbing layer 7113, and the first interlayer bonding layer 715 may be disposed beneath the substrate 7111.

In an exemplary embodiment, the substrate 7111 may include at least one of PET, PI, PC, polyethylene ("PE"), polypropylene ("PP"), polysulfone ("PSF"), polymethylmethacrylate ("PMMA"), triacetylcellulose ("TAC"), and cycloolefin polymer ("COP"), or the like, for example.

The first light absorbing layer 7113 is disposed on the upper surface of the substrate 7111. The first light absorbing layer 7113 may be disposed directly on the upper surface of the substrate 7111. In some exemplary embodiments, the first light absorbing layer 7113 may be disposed so as to completely cover functional layers disposed thereunder. The first light absorbing layer 7113 may be disposed over the entire upper surface of the substrate 7111.

The first light absorbing layer 7113 may be disposed so as to completely cover the acoustic vibration element 702 thereunder. In other words, the acoustic vibration element 702 may completely overlap the first light absorbing layer 7113. The first light absorbing layer 7113 prevents the transmission of light to prevent the acoustic vibration element 702 thereunder from being viewed from above. The first light absorbing layer 7113 may include a light absorbing material such as a black pigment or dye. In an exemplary embodiment, the first light absorbing layer 7113 may include a black ink, for example. The first light absorbing layer 7113 may be disposed on the upper surface of the substrate 7111 by coating or printing.

In this exemplary embodiment, a case where the first light absorbing layer 7113 is disposed on the upper surface of the substrate 7111 is exemplified, but the invention is not limited thereto.

In an exemplary embodiment, as shown in FIG. 10, a light absorbing member 711a may include a substrate 7111 and a second light absorbing layer 7115 disposed under the substrate 7111, for example. The top bonding layer 713 may be disposed on the substrate 7111, and the first interlayer bonding layer 715 may be disposed beneath the second light absorbing layer 7115. Here, since a description of the second light absorbing layer 7115 is substantially the same as or similar to the case of the aforementioned first light absorbing layer 7113, it will be omitted.

Further, as shown in FIG. 11, a light absorbing member 711*b* may include a substrate 7111, a first light absorbing layer 7113 disposed on the substrate 7111, and a second light absorbing layer 7115 disposed beneath the substrate 7111. The top bonding layer 713 may be disposed on the first light absorbing layer 7113, and the first interlayer bonding layer 715 may be disposed beneath the second light absorbing layer 7115. In some exemplary embodiments, the first light absorbing layer 7113 and the second light absorbing layer 7115 may be disposed to completely cover the acoustic vibration element 702 thereunder.

The top bonding layer 713 is disposed on the upper surface of the light absorbing member 711. The top bonding layer 713 serves to attach the panel bottom member 700 to the lower surface of the display panel 500. The top bonding layer 713 may include an adhesive layer or a resin layer. In an exemplary embodiment, the top bonding layer may include a polymer material, such as a silicone-based polymer, a urethane-based polymer, a SU polymer of a silicone-urethane hybrid structure, an acryl-based polymer, an isocyanate-based polymer, a polyvinyl alcohol-based polymer, a gelatin-based polymer, a vinyl-based polymer, a latex-based polymer, an aqueous polyester-based polymer, or any combinations thereof.

The first interlayer bonding layer 715 is disposed on the lower surface of the light absorbing member 711. The first interlayer bonding layer 715 attaches the light absorbing-member 711 and the buffer member 721. Further, the first interlayer bonding layer 715 is disposed to overlap the acoustic vibration element 702, so as to attach the light absorbing member 711 and the acoustic vibration element 702.

The material of the first interlayer bonding layer 715 may include the exemplified materials of the aforementioned top bonding layer 713.

The buffer member 721 absorbs an external impact to prevent the display panel 500, the window 100, and the like from being damaged. The buffer member 721 may be a single layer or a plurality of laminated films. In an exemplary embodiment, the buffer member 721 may include a polymer resin such as polyurethane, polycarbonate, polypropylene, or polyethylene, or may include a sponge, which is provided by foam-molding an elastic material such as a rubber, a urethane-based material, or an acryl-based material. The buffer member 721 may be a cushion layer.

The buffering member 721 may not overlap the acoustic vibration element 702. As described above, the buffer member 721 may include an elastic material. The acoustic vibration element 702 generates vibration in response to an acoustic signal or the like, and the generated vibration is transmitted to the display panel 500 to generate sound. That is, the display panel 500 serves as a diaphragm of a speaker. Therefore, in order to transmit the vibration generated from the acoustic vibration element 702 to the display panel without being absorbed by the buffer member 721, the buffer member 721 may not overlap the acoustic vibration element 702.

The second interlayer bonding layer 723 serves to bond another member to the buffer member 721, and may include a material the same as that of the aforementioned material of the top bonding layer 713. In this exemplary embodiment, the second interlayer bonding layer 723 may attach the heat radiation member 730 to the buffer member 721. In some exemplary embodiments, the second interlayer bonding layer 723 may not overlap the acoustic vibration element 702.

The heat radiation member 730 may be disposed beneath the second interlayer bonding layer 723. The heat radiation member 730 may include at least one heat radiation layer. In the drawings, a case where the heat radiation member 730 includes two heat radiation layers 731 and 735 and a bonding layer 733 is illustrated.

The first heat radiation layer 731 and the second heat radiation layer 735 may include the same material with each other, but may also include materials having different heat radiation properties from each other. In an exemplary embodiment, the first heat radiation layer 731 may include graphite, carbon nanotubes, or the like, for example. The second heat radiation layer 735 may include various materials capable of blocking electromagnetic waves and having excellent thermal conductivity. In an exemplary embodiment, the second heat radiation layer 735 may include a metal thin film including a metal such as copper, nickel, ferrite, silver, or the like, for example.

The second heat radiation layer 735 is disposed under the first heat radiation layer 731. In some exemplary embodiments, the first heat radiation layer 731 and the second heat radiation layer 735 are disposed to overlap each other. The first heat radiation layer 731 is smaller than the second heat radiation layer 735, that is, the side surface of the first heat radiation layer 731 may be located inwards compared to the side surface of the second heat radiation layer 735.

The bonding layer 733 is disposed between the first heat radiation layer 731 and the second heat radiation layer 735. The bonding layer 733 may attach the first heat radiation layer 731 and the second heat radiation layer 735, and may completely cover the first heat radiation layer 731. The material of the bonding layer 733 may include the exemplified materials of the aforementioned top bonding layer 713.

In some exemplary embodiments, the heat radiation member 730 may not overlap the acoustic vibration element 702 in order to secure a space in which the acoustic vibration element 702 may vibrate.

The acoustic vibration element 702 is disposed under the first interlayer bonding layer 713, and is located in the element region SA.

Since descriptions of the first electrode 7021, the second electrode 7022, and the vibration material layer 7023 of the acoustic vibration element 702 are the same as those described above, they are omitted.

Hereinafter, characteristics of the acoustic vibration element and a process of generating sound depending on the characteristics thereof will be described with further reference to FIGS. 23 and 24.

Figure 23:
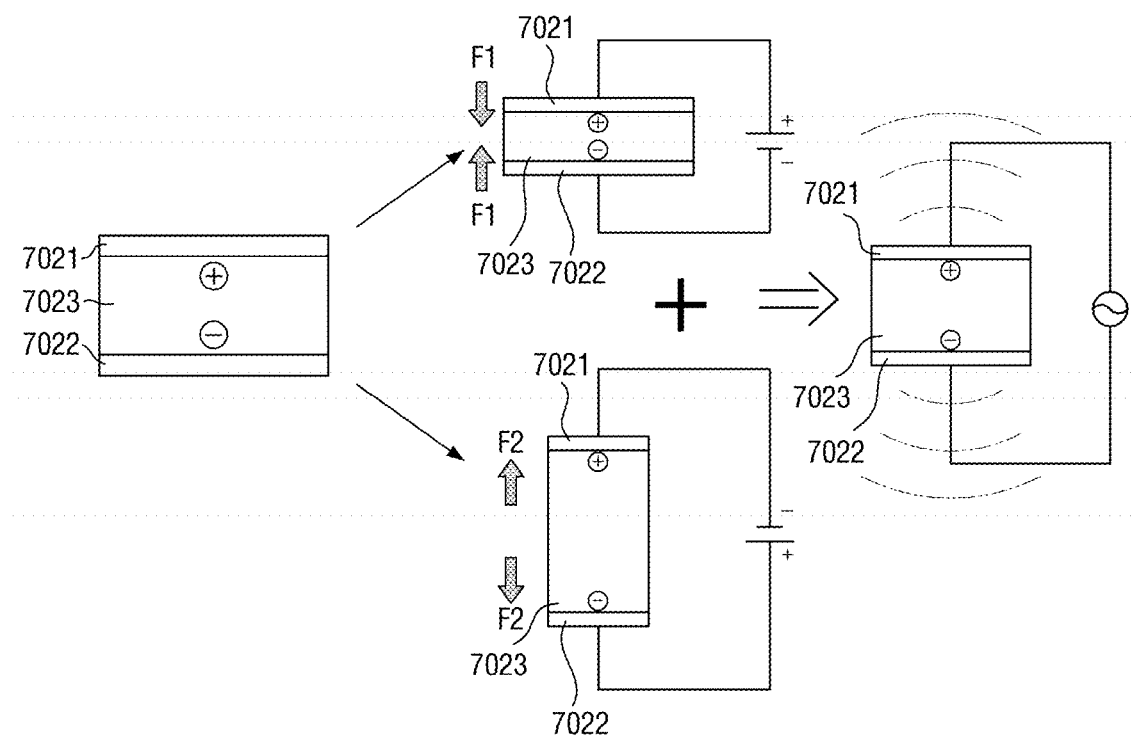
FIG. 23 is a conceptual view for explaining the characteristics of an acoustic vibration element.
Figure 24:
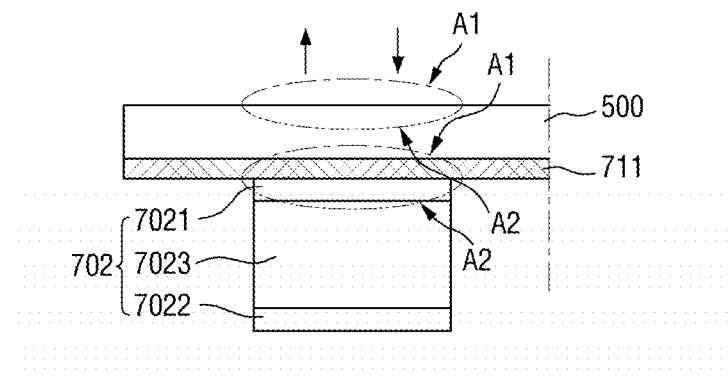
FIG. 24 is a conceptual view for explaining a process of generating sound by the acoustic vibration element.

FIG. 23 is a conceptual view for explaining characteristics of the acoustic vibration element, and FIG. 24 is a conceptual view for explaining a process of generating sound by the acoustic vibration element. For convenience of explanation, FIG. 24 shows only the acoustic vibration element 702, the light absorbing member 711, and the display panel 500.

Referring to FIGS. 23 and 24, the vibration material layer 7023 contracts due to first force F1 or relaxes or expands due to second force F2, according to the polarity direction of an applied voltage. Accordingly, when an AC voltage is applied to the first electrode 7021 and the second electrode 7022, respectively, the vibration material layer 7023 repeats contraction and relaxation due to an inverse piezoelectric effect.

The acoustic vibration element 702 vibrates due to such repetition of contraction and relaxation.

When the acoustic vibration element 702 relaxes, the display panel 500 may be temporarily deformed upward as shown by the dotted line A1. Further, when the acoustic vibration element 702 contracts, the display panel 500 may be temporarily deformed downward as shown by the dotted line A2. The display panel 500 vibrates up and down according to repetition of contraction and relaxation of the acoustic vibration element 702 to output sound.

That is, the display panel 500 itself functions as a diaphragm of a speaker.

Generally, in a speaker, as the size of the diaphragm of the speaker becomes larger, the intensity of sound pressure of a sound output from the diaphragm becomes stronger, and the output characteristic in a low-frequency range becomes better. Therefore, the intensity of the sound pressure output through the display panel 500 and the output characteristics in the low-frequency range may be adjusted depending on the area of the display panel 500. In particular, the size of a diaphragm of a general speaker applied to a general display device is very small compared to the area of a display panel. Therefore, the intensity of sound pressure of the sound outputted from the display device 1 according to an exemplary embodiment of the invention, in which the display panel 500 itself is used as a diaphragm, and the output characteristics in the low-frequency range of the display device 1, are excellent compared to the intensity of sound pressure of the sound outputted from a general speaker and the output characteristics in the low-frequency range of the general speaker.

Further, since the display device 1 does not have a separate speaker and uses a part of the display panel 500 as a diaphragm, this display device 1 has advantages that the size thereof may be reduced and the structure thereof may be simplified. Further, since a part or whole of the acoustic vibration element 702 may be disposed in the display area DA, this display device 1 has advantages that the size of the display area DA may be increased and sound may be outputted even from the display area DA.

Moreover, since the panel bottom member 700 includes the acoustic vibration element 702, this display device 1 has advantages that the acoustic vibration element 702 and the display panel 500 may be coupled with each other through the process of attaching the panel bottom member 700 to the display panel 500 and thus the process of manufacturing the display device 1 may be simplified.

Figure 12:
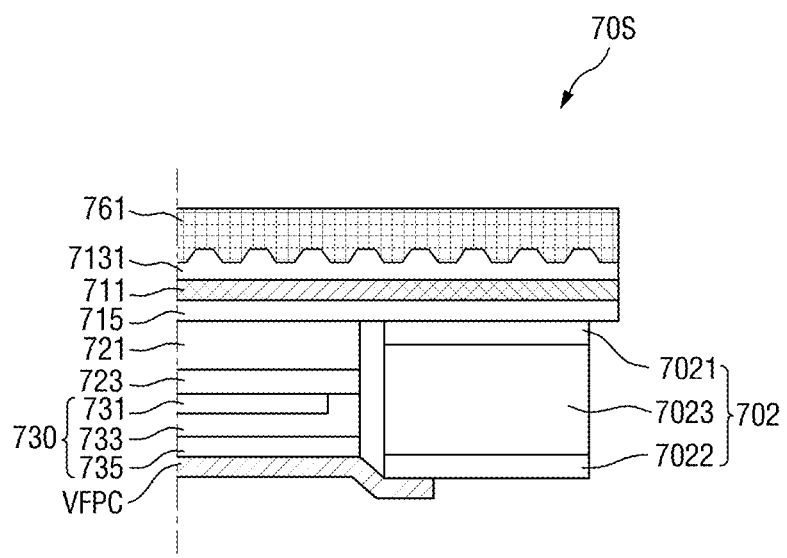
FIG. 12 is a cross-sectional view of an exemplary embodiment of a panel bottom member structure according to the invention.

FIG. 12 is a cross-sectional view of a panel bottom member structure according to an exemplary embodiment of the invention, and, more specifically, is a cross-sectional view showing a structure before the panel bottom member and element circuit board shown in FIG. 8 are connected to the display panel. Hereinafter, the panel bottom member structure refers to a structure in which the panel bottom member and the element circuit board are combined.

Referring to FIG. 12, a panel bottom member structure 70S includes a first release film 761 disposed on the upper surface of the top bonding layer 713. The first release film 761 protects the top bonding layer 713 by covering the upper surface of the top bonding layer 713 before attaching the panel bottom member structure 70S to the display panel 500, and is detached from the top bonding layer 713 to expose the upper surface of top bonding layer, the upper surface thereof becoming a bonding surface, when attaching the panel bottom member structure 70S to the display panel 500.

The first release film 761 is in contact with the top bonding layer 713, but is not completely adhered to the top bonding layer 713 and may be in contact with the top bonding layer 713 to such a degree that it may be detached from the top bonding layer 713 in a subsequent process. In an exemplary embodiment, the first release film 761 may include PET, PC, PI, paper, or the like, for example. In order to increase the releasing force of the first release film 761, the upper surface of the film may be treated with a silicon solution or a release coating layer including a silicon resin may be disposed on upper surface of the film, but the invention is not limited thereto.

In some exemplary embodiments, the lower surface of the first release film 761 may have an embossed shape. The embossed shape of the lower surface of the first release film 761 is transferred to the upper surface of the top bonding layer 713 adjacent to the first release film 761, and thus the upper surface of the top bonding layer 713 may also have an embossed shape 7131 complementary to the shape of the lower surface of the first release film 761. In the case where the upper surface of the top bonding layer 713 has an embossed shape 7131, the embossed shape 7131 serves as an air passage when the panel bottom member 70 is attached to the lower surface of the display panel 500, so as to reduce air bubbles. When the top bonding layer 713 is completely attached to the lower surface of the display panel 500, the embossed shape 7131 of the upper surface of the top bonding layer 713 may be collapsed, and thus the upper surface of the top bonding layer 713 may be flattened, as shown in FIG. 6.

Since the configuration of the panel bottom member structure 70S is substantially the same as that of the description of each component of the panel bottom member 700 and the description of the element circuit board VFPC, having been described with reference to FIG. 8, it will be omitted.

Figure 13:
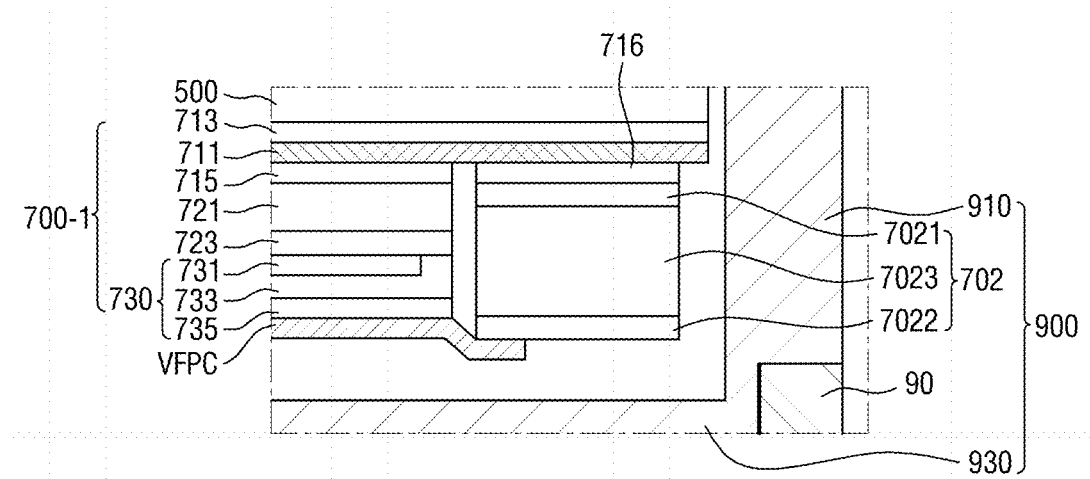
FIG. 13 is a cross-sectional view showing a modification example of FIG. 8.
Figure 14:
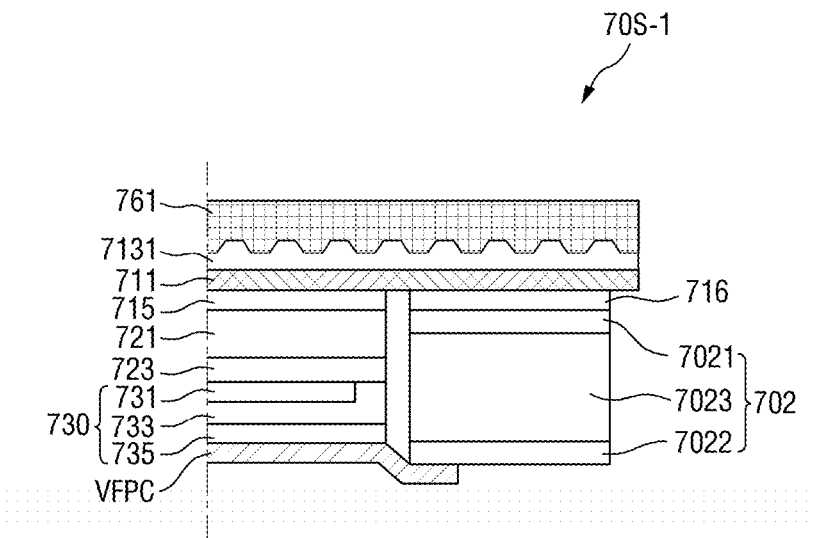
FIG. 14 is a cross-sectional view showing a modification example of FIG. 12.

FIG. 13 is a cross-sectional view showing a modification example of FIG. 8, and FIG. 14 is a cross-sectional view showing a modification example of FIG. 12. The panel bottom member 700-1 shown in FIG. 13 is different from the panel bottom member 700 according to the exemplary embodiment of FIG. 8 in that the acoustic vibration element 702 is coupled with the light absorbing member 711 through a separate coupling member 716. Similarly, the panel bottom member structure 70S-1 shown in FIG. 14 is different from the panel bottom member structure 70S according to the exemplary embodiment of FIG. 12 in that the acoustic vibration element 702 is coupled with the light absorbing member 711 through a separate coupling member 716.

Referring to FIGS. 13 and 14, the first interlayer bonding layer 715 and the acoustic vibration element 702 may not overlap each other, and may not contact each other. In other words, the acoustic vibration element 702 is not coupled with the light absorbing member 711 through the first interlayer bonding layer 715.

The coupling member 716 may be disposed between the acoustic vibration element 702 and the light absorbing member 711, and the acoustic vibration element 702 may be coupled with the light absorbing member 711 through the coupling member 716.

The coupling member 716 may be spaced apart from the first interlayer bonding layer 715.

In some exemplary embodiments, the coupling member 716 may include a double-sided adhesive tape. The coupling member 716 may include a material different from the material of the first interlayer coupling layer 715.

Figure 15:
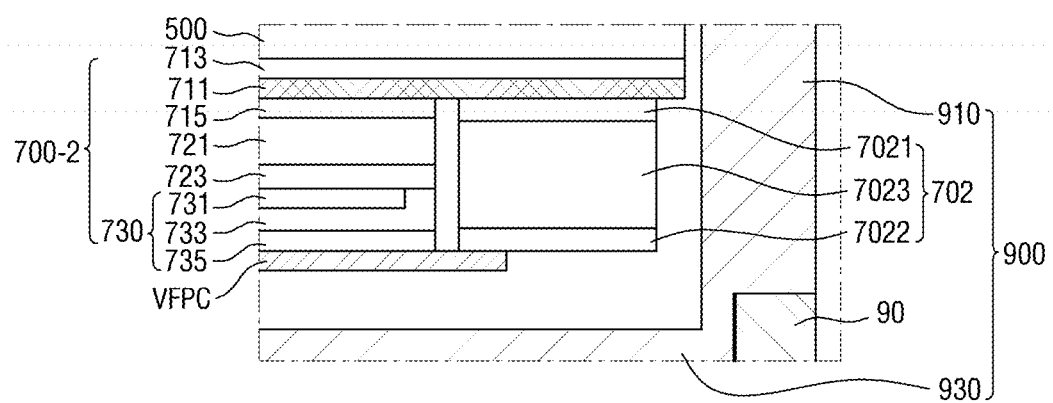
FIG. 15 is a cross-sectional view showing another modification example of FIG. 8.
Figure 16:
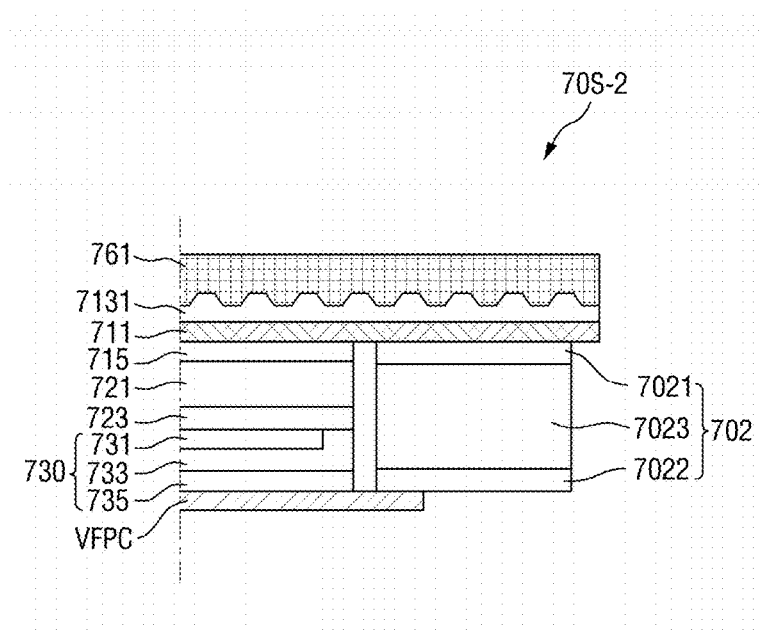
FIG. 16 is a cross-sectional view showing another modification example of FIG. 12.

FIG. 15 is a cross-sectional view showing another modification example of FIG. 8, and FIG. 16 is a cross-sectional view showing another modification example of FIG. 12. The panel bottom member 700-2 shown in FIG. 15 and the panel bottom member structure 70S-2 shown in FIG. 16 are different from the panel bottom member 700 according to the exemplary embodiment of FIG. 8 and the panel bottom member structure 70S according to the exemplary embodiment of FIG. 12 in that the acoustic vibration element 702 is disposed to directly contact the lower surface of the light absorbing member 711 without a separate medium.

Referring to FIGS. 15 and 16, the first interlayer bonding layer 715 and the acoustic vibration element 702 may not overlap each other, and may not contact each other.

The first electrode 7021 of the acoustic vibration element 702 may directly contact the lower surface of the light absorbing member 711, the vibration material layer 7023 may be disposed beneath the first electrode 7021, and the second electrode 7022 may be disposed beneath the vibration material layer 7023. In an exemplary embodiment, such a structure may be obtained by a process in which a conductive layer is deposited on the lower surface of the light absorbing member and this conductive layer is patterned to form a first electrode 7021, a vibration material is deposited on the lower surfaces of the first electrode 7021 and the light-absorbing member 711 and this vibration material is patterned to form a vibration material layer 7023, a conductive layer is deposited on the lower surfaces of the vibration material layer 7023 and the light absorbing member 711 and this conductive layer is patterned to form a second electrode 7022, a base layer 7020 (refer to FIG. 5) is disposed on the second electrode 7022, and a conductive layer is deposited on the base layer 7020 (refer to FIG. 5) and this conductive layer is patterned to form a first pad 702P1 (refer to FIG. 5) and a second pad 702P2 (refer to FIG. 5), for example. In this case, the first pad 702P1 (refer to FIG. 5) may be connected to the first electrode 7021 through a first hole CH1 (refer to FIG. 5) penetrating the base layer 7020 (refer to FIG. 5) and the vibration material layer 7023, and the second pad 702P2 (refer to FIG. 5) may be connected to the second electrode 7022 through a second hole CH2 (refer to FIG. 5) penetrating the base layer 7020 (refer to FIG. 5).

This structure is not limited thereto, and may be realized by various methods.

Figure 17:
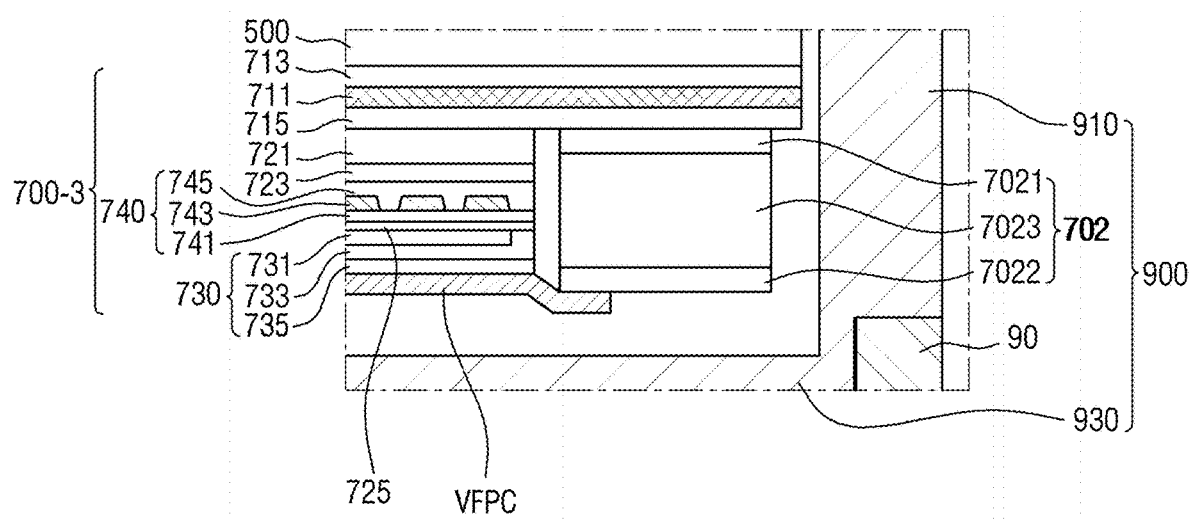
FIG. 17 is a cross-sectional view showing still another modification example of FIG. 8.
Figure 18:
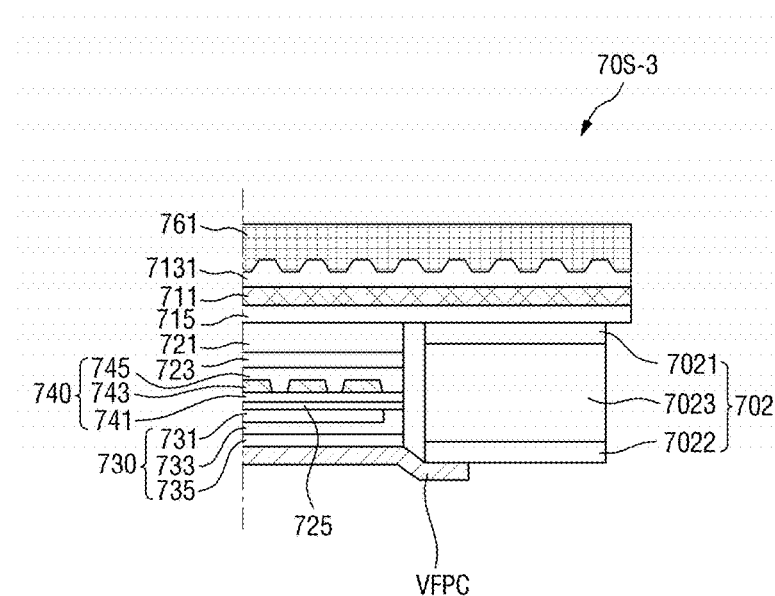
FIG. 18 is a cross-sectional view showing still another modification example of FIG. 12.

FIG. 17 is a cross-sectional view showing still another modification example of FIG. 8, and FIG. 18 is a cross-sectional view showing another modification example of FIG. 12. The panel bottom member 700-3 shown in FIG. 17 and the panel bottom member structure 70S-3 shown in FIG. 18 are different from the panel bottom member 700 according to the exemplary embodiment of FIG. 8 and the panel bottom member structure 70S according to the exemplary embodiment of FIG. 12 in that each of the panel bottom member 700-3 and the panel bottom member structure 70S-3 further includes a digitizer 740 and a third interlayer bonding layer 725. Other configurations are substantially the same as or similar to each other.

Referring to FIGS. 17 and 18, a digitizer 740 may be disposed beneath the buffer member 721, and the digitizer 740 may be located between the buffer member 721 and the heat radiation member 730.

The digitizer 740 may be disposed under the second interlayer bonding layer 723 to be attached to the buffer member 721 through the second interlayer bonding layer 723.

The third interlayer bonding layer 725 may be disposed between the digitizer 740 and the heat radiation member 730, and the heat radiation member 730 may be attached to the digitizer 740 through the third interlayer bonding layer 725. The material of the third interlayer bonding layer 725 may be selected from the exemplified materials of the aforementioned top bonding layer 713.

The digitizer 740, which is one of the input devices, receives position information indicated by a user on a screen, unlike an input device such as a keyboard or a mouse. In an exemplary embodiment, the digitizer 740, for example, recognizes the movement of a stylus pen and converts it into a digital signal. The digitizer 740 may be provided in the form of a film or panel.

The digitizer 740 may include a wiring pattern 743 and insulation layers 741 and 745 surrounding the wiring pattern 743. Specifically, the digitizer 740 may include a first insulation layer 741, a wiring pattern 743 disposed on the upper surface of the first insulation layer 741, and a second insulation layer 745 covering the upper surface of the wiring pattern 743. The wiring pattern 743 covers part of the upper surface of the first insulation layer 741, and exposes another part thereof. The second insulation layer 745 may be disposed on the exposed upper surface of the first insulation layer 741 as well as on the upper surface and side surface of the wiring pattern 743.

In an exemplary embodiment, the wiring pattern 743 may include a metal material such as copper, silver, nickel, tungsten, or the like, for example. The wiring pattern 743 may include a single film or a plurality of laminated films. In an exemplary embodiment, the wiring pattern 743 may be a double film including a lower copper film and an upper copper film.

The wiring pattern 743 may include not only a wiring or electrode for transmitting a signal but also a floating wiring, a floating electrode, or the like.

Each of the first and second insulation layers 741 and 745 may include an organic insulating material, an inorganic insulating material, or an organic-inorganic insulating material, or may include a bonding material such as an adhesive material.

When the wiring pattern includes a material such as a metal, it well reflects light incident from above because its reflectance is high. When the reflected light is emitted toward the display area DA, there is a concern that the user may recognize the shape of the wiring pattern 743, and thus the image quality of the display device 1 may be adversely affected.

In addition, since the wiring pattern 743 is provided only in a part of the upper surface of the first insulation layer 741, a step may occur between a portion where the wiring pattern 743 is located and a portion where the wiring pattern 743 is not located. This step shape may be partially reflected even in the upper layer thereof. That is, for a concise explanation, although it is shown in the drawings that the upper surface of the second insulation layer 745 is flat, in some exemplary embodiments, the upper surface of the second insulation layer 745 may have an uneven shape, not a flat shape, as the second insulation layer 745 conformably reflects the step shape according to the wiring pattern 743. This surface unevenness may also affect other layers disposed over the second insulation layer 745 to allow these layers to partially have surface unevenness. The surface unevenness of each of the layers may have an influence on the visual recognition of a specific pattern on a screen by changing the reflectance and reflection angle (emission direction of reflected light) with respect to incident light.

The light absorbing member 711 prevents such reflected light from being emitted toward the display area DA. That is, the light absorbing member 711 overlaps the digitizer 740 to completely cover the digitizer 740.

Although it is shown in the drawings that the second insulation layer 745 of the digitizer 740 contacts the second interlayer bonding layer 723 and the first insulation layer 741 of the digitizer 740 contacts the third interlayer bonding layer 725, this is only one example. In some exemplary embodiments, the first insulation layer 741 may contact the second interlayer bonding layer 723, and the second insulation layer 745 may contact the third interlayer bonding layer 725.

In some exemplary embodiments, in order to secure a space in which the acoustic vibration element 702 may vibrate, the digitizer 740 may not overlap the acoustic vibration element 702, and may be spaced apart from the acoustic vibration element 702.

Figure 19:
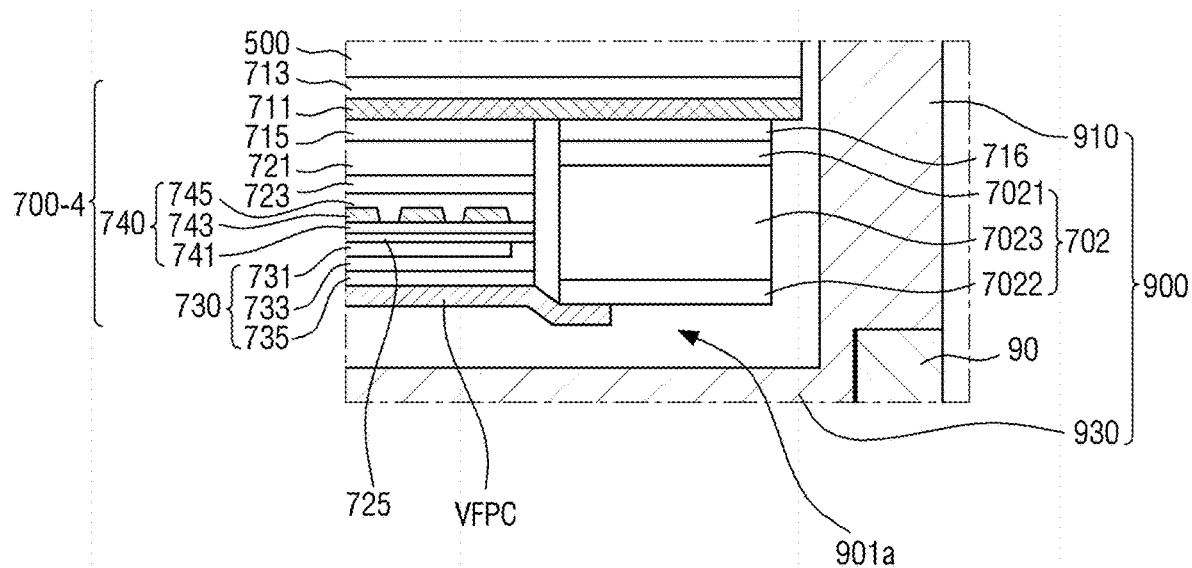
FIG. 19 is a cross-sectional view showing still another modification example of FIG. 8.
Figure 20:
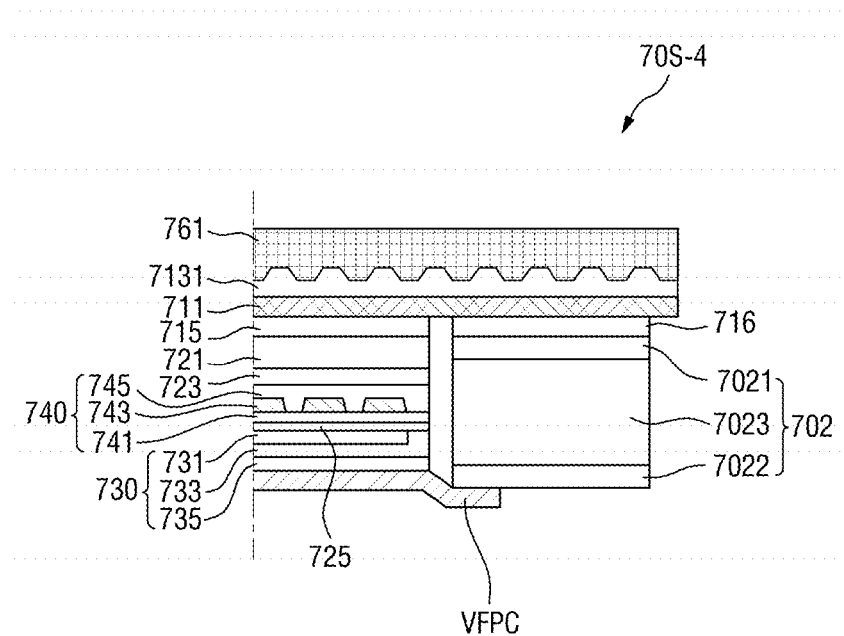
FIG. 20 is a cross-sectional view showing still another modification example of FIG. 20.

FIG. 19 is a cross-sectional view showing still another modification example of FIG. 8, and FIG. 20 is a cross-sectional view showing another modification example of FIG. 12. The panel bottom member 700-4 shown in FIG. 19 and the panel bottom member structure 70S-4 shown in FIG. 20 are different from the panel bottom member 700 according to the exemplary embodiment of FIG. 8 and the panel bottom member structure 70S according to the exemplary embodiment of FIG. 12 in that each of the panel bottom member 700-4 and the panel bottom member structure 70S-4 further includes the digitizer 740 and the third interlayer bonding layer 725 and in that the acoustic vibration element 702 is coupled with the light absorbing member 711 through a separate coupling member 716. Other configurations are substantially the same as or similar to each other.

The description of the digitizer 740 and the third interlayer bonding layer 725 is the same as that having been described with reference to FIGS. 17 and 18, and the description related to the coupling member 716 is the same as that having been described with reference to FIGS. 13 and 14. Therefore, a detailed description thereof will be omitted.

Figure 21:
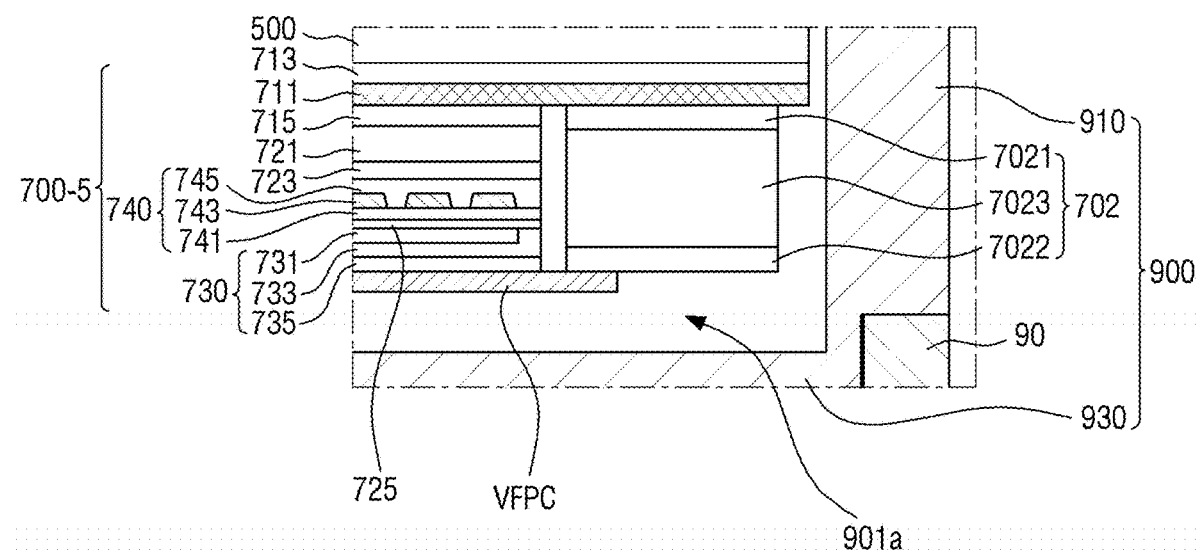
FIG. 21 is a cross-sectional view showing still another modification example of FIG. 8.
Figure 22:
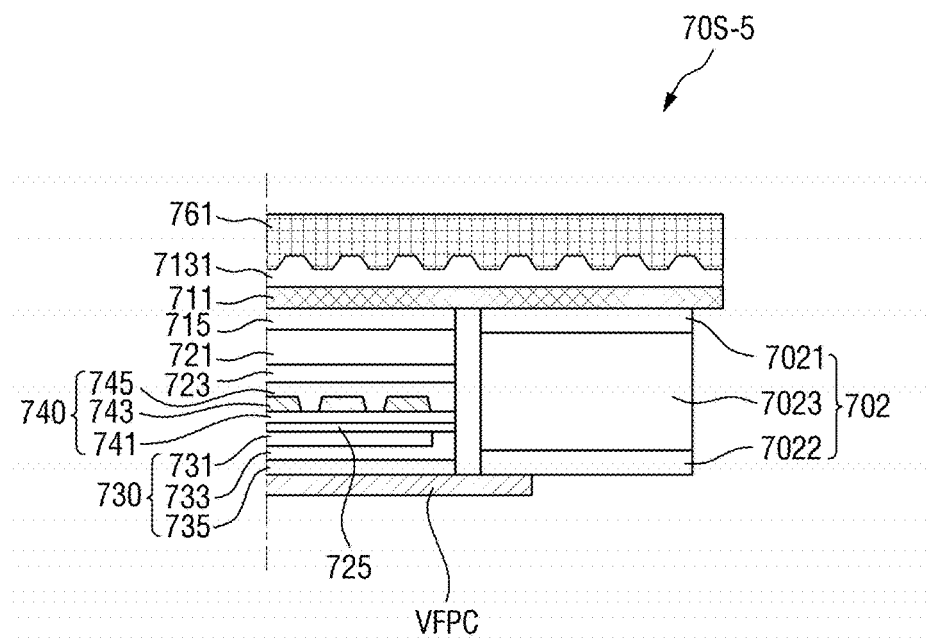
FIG. 22 is a cross-sectional view showing still another modification example of FIG. 12.

FIG. 21 is a cross-sectional view showing still another modification example of FIG. 8, and FIG. 22 is a cross-sectional view showing another modification example of FIG. 12. The panel bottom member 700-5 shown in FIG. 21 and the panel bottom member structure 70S-5 shown in FIG. 22 are different from the panel bottom member 700 according to the exemplary embodiment of FIG. 8 and the panel bottom member structure 70S according to the exemplary embodiment of FIG. 12 in that each of the panel bottom member 700-5 and the panel bottom member structure 70S-5 further includes the digitizer 740 and the third interlayer bonding layer 725 and in that the acoustic vibration element 702 directly contacts the lower surface of the light absorbing member 711. Other configurations are substantially the same as or similar to each other.

The description of the digitizer 740 and the third interlayer bonding layer 725 is the same as that having been described with reference to FIGS. 17 and 18, and the description related to the coupling between the acoustic vibration element 702 and the light absorbing member 711 is the same as that having been described with reference to FIGS. 15 and 16. Therefore, a detailed description thereof will be omitted.

Figure 25:
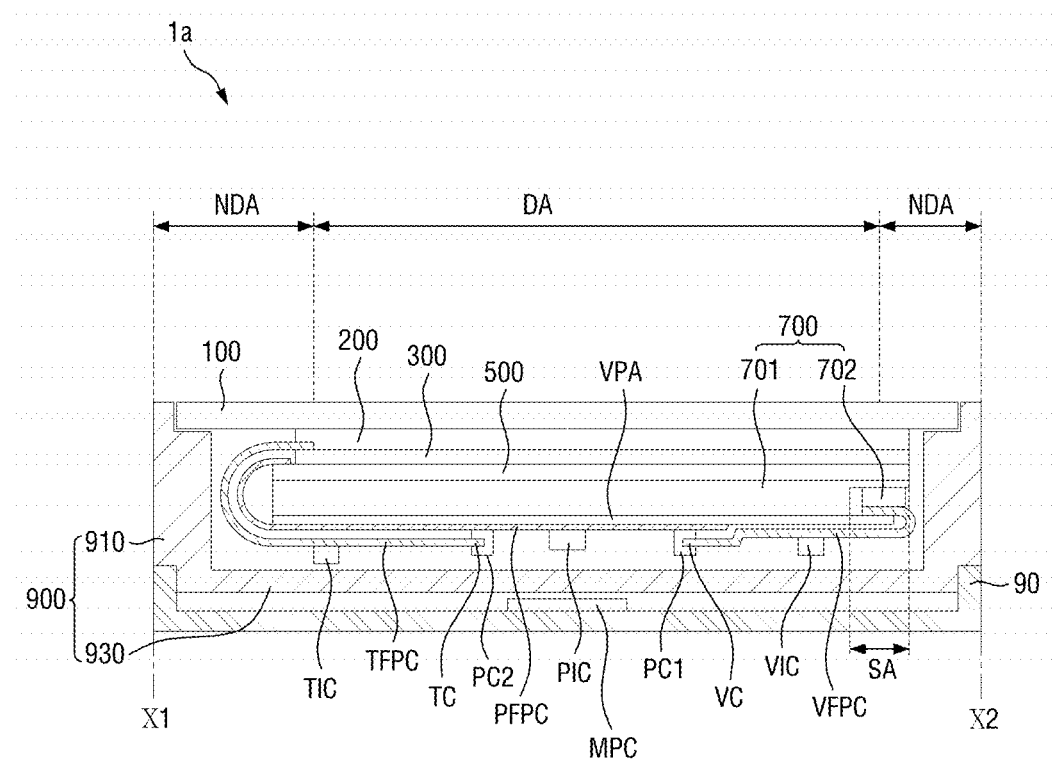
FIG. 25 is a cross-sectional view showing a modification example of FIG. 6.

FIG. 25 is a cross-sectional view showing a modification example of FIG. 6. The display device 1*a* shown in FIG. 25 is different from the display device 1 shown in FIG. 6 in that it further includes an acoustic element protection member VPA. Other configurations are substantially the same as or similar to each other. Therefore, differences will be mainly described.

Referring to FIG. 25, an acoustic element protection member VPA is disposed beneath the panel bottom member 700. The acoustic element protection member VPA is disposed to overlap the acoustic vibration element 702 to protect the acoustic vibration element 702 from an external impact or the like. In some exemplary embodiments, the acoustic element protection member VPA may include a material the same as or similar to the material of the buffer member 721, and may have elasticity.

One side of the element circuit board VFPC connected to the acoustic vibration element 702 may be disposed between the acoustic vibration element 702 and the acoustic element protection member VPA. The element circuit board VFPC may be bent toward the lower side of the acoustic element protection member VPA, and the connecting portion VC provided at the other side of the element circuit board VFPC may be electrically connected to the panel circuit board PFPC through the first connecting portion PC1 of the panel circuit board PFPC.

Figure 26:
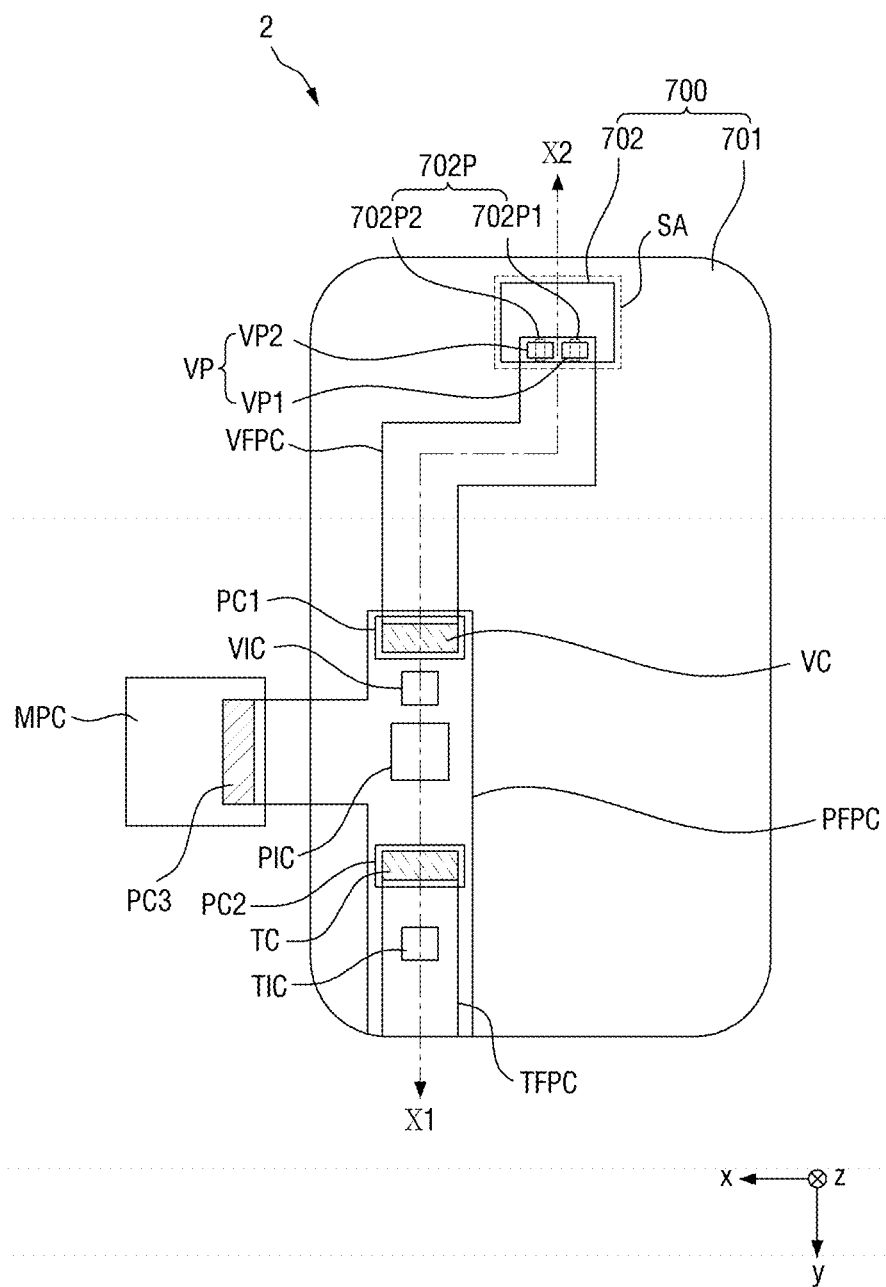
FIG. 26 is a view showing another exemplary embodiment of the connection structure among an acoustic vibration element, a flexible circuit board, a panel flexible circuit board, a touch flexible circuit board and a main circuit board in a display device.
Figure 27:
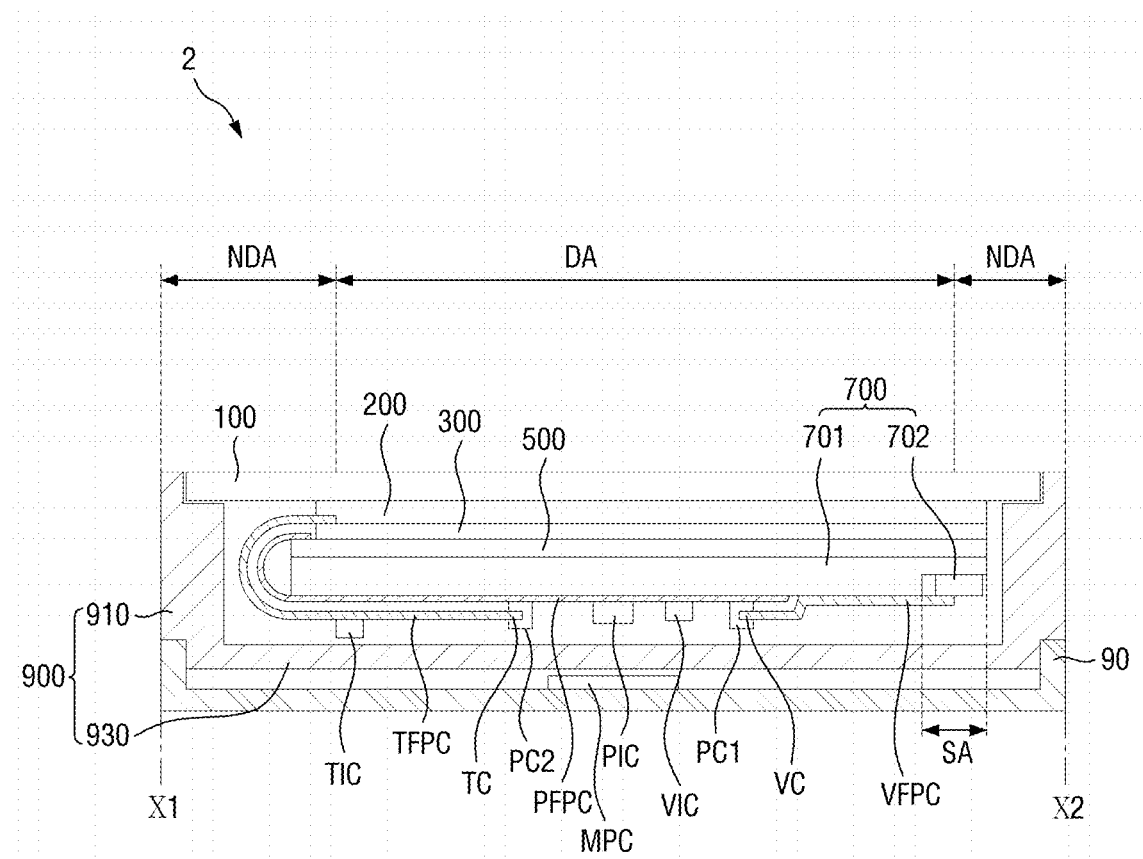
FIG. 27 is a cross-sectional view of another exemplary embodiment of a display device according to the invention taken along line X1-X2 in FIGS. 1 and 26.

FIG. 26 is a view showing the connection structure among an acoustic vibration element, a flexible circuit board, a panel flexible circuit board, a touch flexible circuit board and a main circuit board in a display device according to another exemplary embodiment, and FIG. 27 is a cross-sectional view of the display device according to another exemplary embodiment of the invention taken along line X1-X2 in FIGS. 1 and 26.

Referring to FIGS. 26 and 27, the display device 2 according to this exemplary embodiment is different from the display device 1 shown in FIGS. 4 and 6 in that the acoustic element driving chip VIC is mounted (e.g., disposed) on the panel circuit substrate PFPC. Other configurations are substantially the same as or similar to each other. Therefore, a detailed description thereof will be omitted.

In the case of the display device 2 according to this exemplary embodiment, since the acoustic element driving chip VIC is mounted (e.g., disposed) on the panel circuit board PFPC electrically connected to the acoustic vibration element 702 through the element circuit board VFPC, there is an advantage that the panel bottom member 700 including the element circuit board VFPC, the acoustic element driving chip VIC, the display panel 500, and the acoustic vibration element 702 may be modularized into one display assembly.

Figure 28:
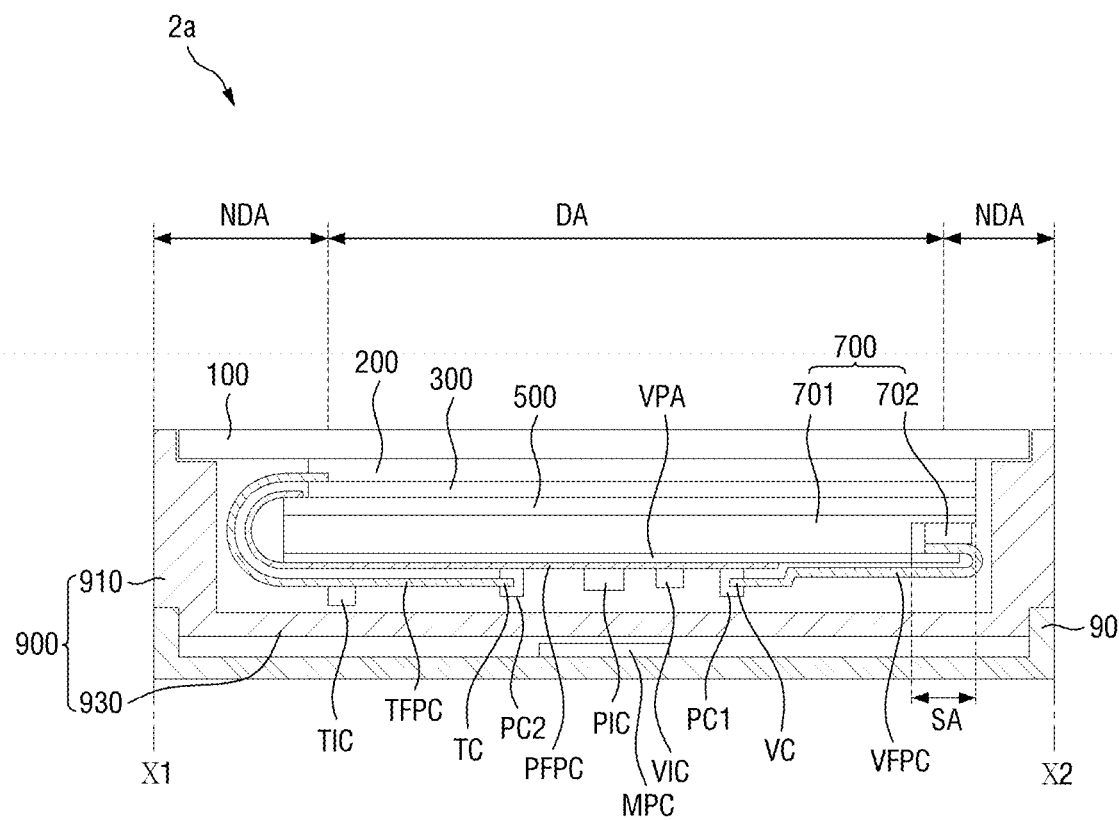
FIG. 28 is a cross-sectional view showing a modification example of FIG. 27.

FIG. 28 is a cross-sectional view showing a modification example of FIG. 27. The display device 2*a* shown in FIG. 28 is different from the display device 2 shown in FIG. 27 in that it further includes an acoustic element protection member VPA. Other configurations are substantially the same as or similar to each other.

Since descriptions related to the acoustic element protection member VPA and the bent element circuit board VFPC are the same as those having been described with reference to FIG. 25, they are omitted.

Figure 29:
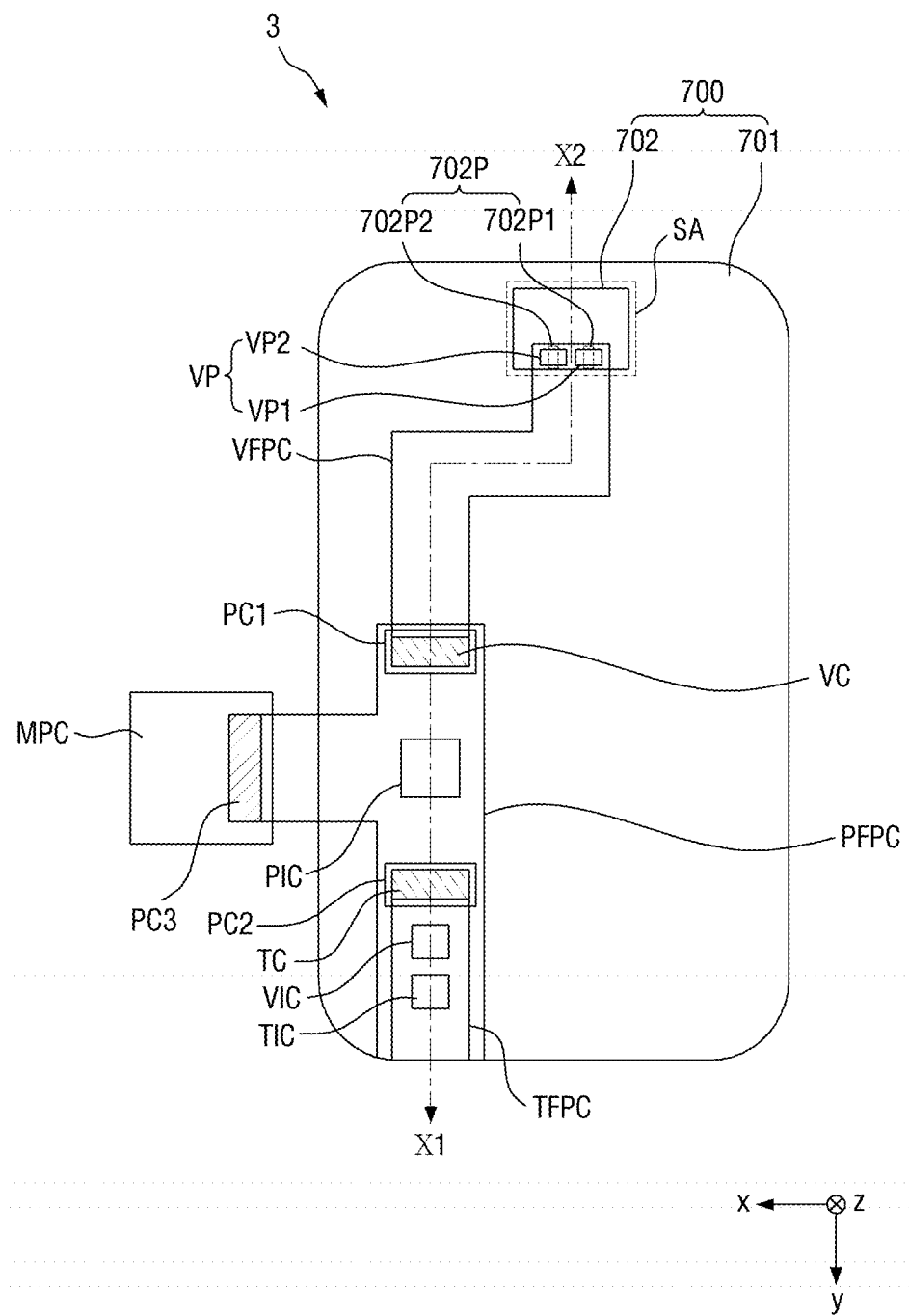
FIG. 29 is a view showing still another exemplary embodiment of the connection structure among an acoustic vibration element, a flexible circuit board, a panel flexible circuit board, a touch flexible circuit board and a main circuit board in a display device.
Figure 30:
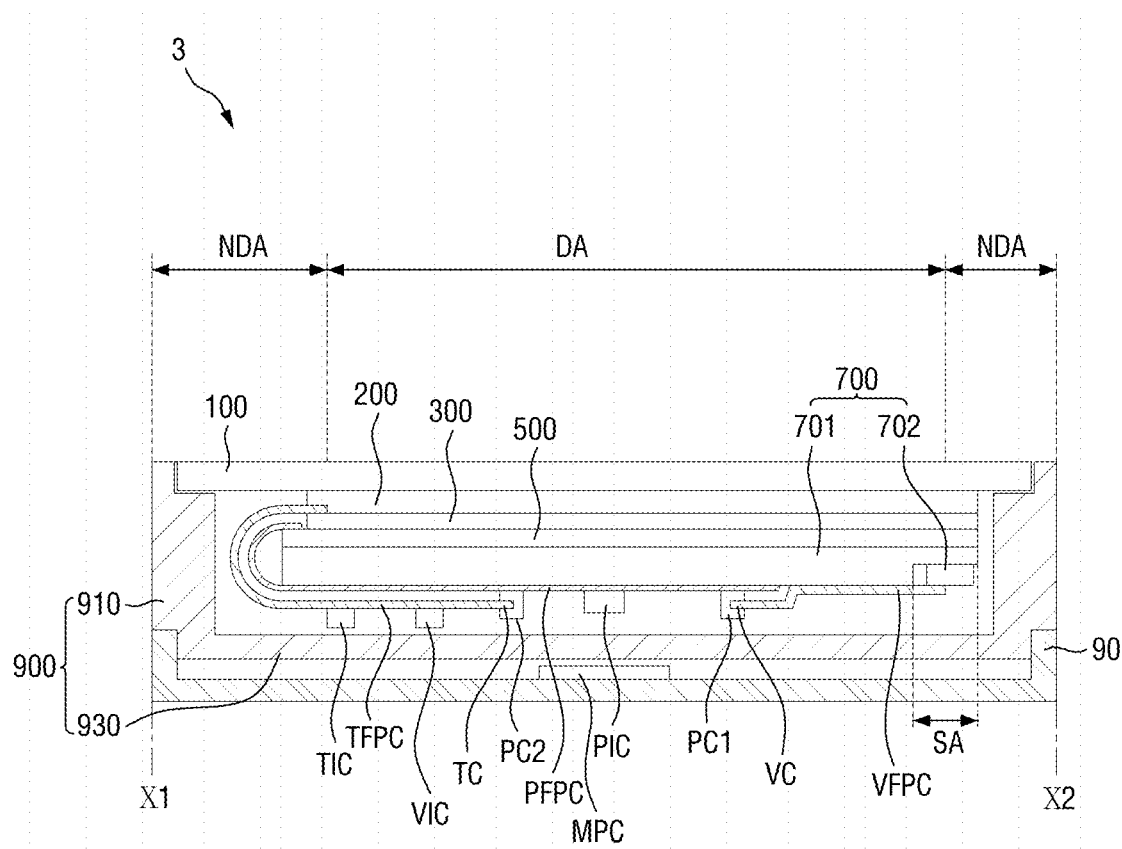
FIG. 30 is a cross-sectional view of still another exemplary embodiment of a display device according to the invention taken along line X1-X2 in FIGS. 1 and 29.

FIG. 29 is a view showing the connection structure among an acoustic vibration element, a flexible circuit board, a panel flexible circuit board, a touch flexible circuit board and a main circuit board in a display device according to still another exemplary embodiment, and FIG. 30 is a cross-sectional view of the display device according to still another exemplary embodiment of the invention taken along line X1-X2 in FIGS. 1 and 29.

Referring to FIGS. 29 and 30, the display device 3 according to this exemplary embodiment is different from the display device 1 shown in FIGS. 4 and 6 in that the acoustic element driving chip VIC is mounted (e.g., disposed) on the touch circuit substrate TFPC. Other configurations are substantially the same as or similar to each other. Therefore, a detailed description thereof will be omitted.

In the case of the display device 3 according to this exemplary embodiment, since the acoustic element driving chip VIC is mounted (e.g., disposed) on the touch circuit board TFPC electrically connected to the acoustic vibration element 702 through the element circuit board VFPC and the panel circuit board PFPC, there is an advantage that the panel bottom member 700 including the element circuit board VFPC, the acoustic element driving chip VIC, the display panel 500, and the acoustic vibration element 702, the panel circuit board PFPC, and the touch circuit board TFPC may be modularized into one display assembly.

Figure 31:
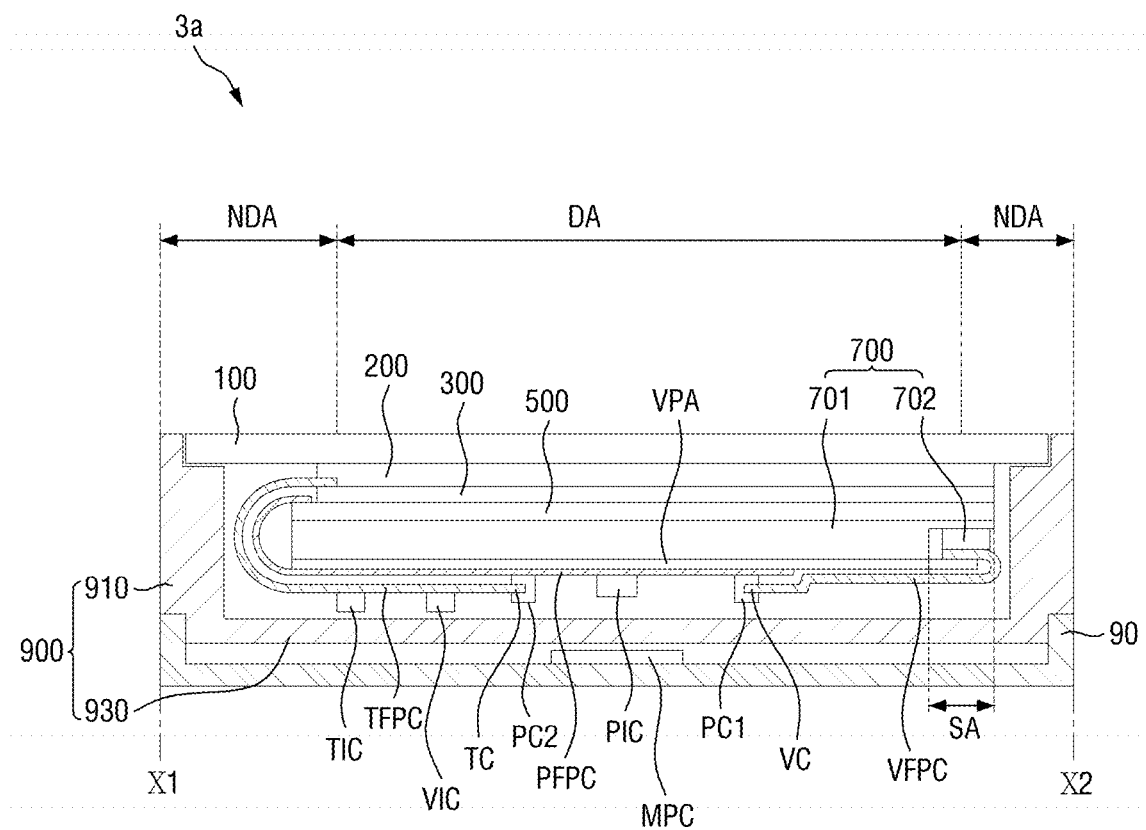
FIG. 31 is a cross-sectional view showing a modification example of FIG. 30.

FIG. 31 is a cross-sectional view showing a modification example of FIG. 30. The display device 3*a* shown in FIG. 31 is different from the display device 3 shown in FIG. 30 in that it further includes an acoustic element protection member VPA. Other configurations are substantially the same as or similar to each other.

Since descriptions related to the acoustic element protection member VPA and the bent element circuit board VFPC are the same as those having been described with reference to FIG. 25, they are omitted.

As described above, according to the exemplary embodiments of the invention, there may be provided a display device having acoustic function and a panel bottom member structure for the display device having acoustic function.

The effects of the invention are not limited by the foregoing, and other various effects are anticipated herein.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
a display panel;
a touch sensing member disposed on the display panel; an acoustic vibration element which is disposed beneath the display panel and is configured to generate a vibration in response to an acoustic signal;
an element circuit board connected to the acoustic vibration element;
a panel circuit board connected to the display panel and the element circuit board;
a touch circuit board connected to the touch sensing member and the panel circuit board;
an acoustic element driving chip which generates the acoustic signal and is electrically connected to the element circuit board,
wherein the panel circuit board includes a first connector connected to the element circuit board, a second connector connected to the touch circuit board,
wherein the display panel includes a display area and a non-display area, and
wherein the first connector and the second connector overlap the display area of the display panel.

2. The display device of claim 1, further comprising:
a diaphragm which outputs a sound in response to the vibration of the acoustic vibration element,
wherein the diaphragm is a part of the display panel.

3. The display device of claim 1,
wherein the acoustic vibration element includes a first electrode, a second electrode, a vibration material layer disposed between the first electrode and the second electrode, a first pad electrically connected with the first electrode, and a second pad electrically connected with the second electrode and spaced apart from the first pad, and
wherein the first pad and the second pad are connected to the element circuit board.

4. The display device of claim 1, further comprising:
a bracket disposed under the display panel,
wherein at least a part of the element circuit board is disposed between the display panel and the bracket.

5. The display device of claim 4, wherein at least a part of the panel circuit board is disposed between the display panel and the bracket.

6. The display device of claim 4, wherein at least a part of the touch circuit board is disposed between the display panel and the bracket.

7. The display device of claim 4, further comprising:
a lower case disposed under the bracket; and
a main circuit board connected to the panel circuit board,
wherein the main circuit board is disposed between the bracket and the lower case.

8. The display device of claim 4, further comprising:
an acoustic element protection member disposed between the bracket and the acoustic vibration element and overlapping the acoustic vibration element,
wherein a portion of the acoustic element protection member is disposed between the acoustic vibration element and the element circuit board.

9. A display device, comprising:
a display panel;
a touch sensing member disposed on the display panel; an acoustic vibration element which is disposed beneath the display panel and is configured to generate a vibration in response to an acoustic signal;
an element circuit board connected to the acoustic vibration element;
a panel circuit board connected to the display panel and the element circuit board;
a touch circuit board connected to the touch sensing member and the panel circuit board;
an acoustic element driving chip which generates the acoustic signal and is electrically connected to the element circuit board,
wherein the display panel includes a base substrate, a self-luminous element disposed on the base substrate, a first inorganic layer disposed on the self-luminous element, an organic layer disposed on the first inorganic layer and a second inorganic layer disposed on the organic layer, and
wherein the touch sensing member is disposed on the second inorganic layer.

10. A display device, comprising:
a display panel;
a touch sensing member disposed on the display panel; an acoustic vibration element which is disposed beneath the display panel and is configured to generate a vibration in response to an acoustic signal;
an element circuit board connected to the acoustic vibration element;
a panel circuit board connected to the display panel and the element circuit board;
a touch circuit board connected to the touch sensing member and the panel circuit board;
an acoustic element driving chip which generates the acoustic signal and is electrically connected to the element circuit board, further comprising:

a window including a light-transmitting portion disposed on the display panel and a light-blocking portion disposed adjacent to the light-transmitting portion, wherein at least a part of the acoustic vibration element overlaps the light-transmitting portion.

11. The display device of claim 1, further comprising:
a window including a light-transmitting portion disposed on the display panel and a light-blocking portion disposed adjacent to the light-transmitting portion, wherein the panel circuit board includes a first connector connected to the element circuit board, a second connector connected to the touch circuit board, and wherein the first connector and the second connector overlap the light-transmitting portion of the window.

12. A display device, comprising:
a display panel;
an acoustic vibration element which is disposed beneath the display panel and is configured to generate a vibration in response to an acoustic signal, and a buffer member disposed beneath the display panel and non-overlapping the acoustic vibration element;
an element circuit board connected to the acoustic vibration element;
a panel circuit board connected to the display panel and the element circuit board; and a panel driving chip which drives the display panel and an acoustic element driving chip which generates the acoustic signal;
a bracket disposed under the display panel;
a lower case disposed under the bracket; and
a main circuit board connected to the panel circuit board,
wherein at least a part of the panel circuit board and at least a part of the element circuit board are disposed between the display panel and the bracket, and
wherein the main circuit board is disposed between the bracket and the lower case.

13. A display device, comprising:
a display panel;
an acoustic vibration element which is disposed beneath the display panel and is configured to generate a vibration in response to an acoustic signal, and a buffer member disposed beneath the display panel and non-overlapping the acoustic vibration element;
an element circuit board connected to the acoustic vibration element;
a panel circuit board connected to the display panel and the element circuit board; and a panel driving chip which drives the display panel and an acoustic element driving chip which generates the acoustic signal;
a bracket disposed under the display panel,
a touch sensing member disposed on the display panel;
a touch circuit board connected to the touch sensing member; and
a touch driving chip electrically connected to the touch circuit board;
wherein at least a part of the panel circuit board and at least a part of the element circuit board are disposed between the display panel and the bracket, and
wherein the touch circuit board is connected to the panel circuit board.

14. A display device, comprising:
a display panel;
a touch sensing member disposed on the display panel;
an acoustic vibration element which is disposed beneath the display panel and is configured to generate a vibration in response to an acoustic signal, and a buffer member disposed beneath the display panel and non-overlapping the acoustic vibration element;
an element circuit board connected to the acoustic vibration element;
a touch circuit board connected to the touch sensing member; and
a touch driving chip which senses a touch and an acoustic element driving chip which generates the acoustic signal,
wherein the element circuit board is electrically connected with the touch circuit board.

15. The display device of claim 14, further comprising:
a bracket disposed under the display panel;
wherein at least a part of the touch circuit board and at least a part of the element circuit board are disposed between the display panel and the bracket.

16. The display device of claim 15, further comprising:
a panel circuit board connected to the display panel, the element circuit board, and the touch circuit board,
wherein at least a part of the panel circuit board is disposed between the display panel and the bracket.

17. The display device of claim 16, further comprising:
a lower case disposed under the bracket; and
a main circuit board connected to the panel circuit board,
wherein the main circuit board is disposed between the bracket and the lower case.

* * * * *